US012638936B2

(12) United States Patent
Moscarillo

(10) Patent No.: US 12,638,936 B2
(45) Date of Patent: May 26, 2026

(54) GESTURE RECOGNITION DEVICES AND METHODS

(71) Applicant: Thomas J. Moscarillo, Woodbridge, CT (US)

(72) Inventor: Thomas J. Moscarillo, Woodbridge, CT (US)

( * ) Notice: Subject to any disclaimer, the term of this patent is extended or adjusted under 35 U.S.C. 154(b) by 0 days.

(21) Appl. No.: 18/224,887

(22) Filed: Jul. 21, 2023

(65) Prior Publication Data

US 2024/0077969 A1     Mar. 7, 2024

Related U.S. Application Data

(60) Continuation of application No. 17/322,556, filed on May 17, 2021, now Pat. No. 11,755,137, which is a
(Continued)

(51) Int. Cl.
| | |
|---|---|
| *G06F 3/041* | (2006.01) |
| *G06F 3/01* | (2006.01) |
(Continued)

(52) U.S. Cl.
CPC ............ *G06F 3/0416* (2013.01); *G06F 3/017* (2013.01); *G06F 3/0426* (2013.01);
(Continued)

(58) Field of Classification Search
CPC ...... G06F 3/017; G06F 3/0416; G06F 3/0426; G06F 3/0488; G06F 3/04886;
(Continued)

(56) References Cited

U.S. PATENT DOCUMENTS

| | | | |
|---|---|---|---|
| 5,732,227 | A | 3/1998 | Kuzunuki |
| 5,767,842 | A | 6/1998 | Korth |
(Continued)

FOREIGN PATENT DOCUMENTS

| | | |
|---|---|---|
| EP | 0554492 A1 | 8/1993 |
| JP | H0683512 A | 3/1994 |
(Continued)

OTHER PUBLICATIONS

Canadian Examination Report, CA3051912, dated Oct. 6, 2020, 4 pages.
(Continued)

*Primary Examiner* — Gene W Lee
(74) *Attorney, Agent, or Firm* — Nelson Mullins Riley & Scarborough LLP

(57) ABSTRACT

Devices and related methods are disclosed herein that generally involve detecting and interpreting gestures made by a user to generate user input information for use by a digital data processing system. In one embodiment, a device includes first and second sensors that observe a workspace in which user gestures are performed. The device can be set to a keyboard input mode, a number pad input mode, or a mouse input mode based on the positioning of the user's hands. Subsequent gestures made by the user can be interpreted as keyboard inputs, mouse inputs, etc., using observed characteristics of the user's hands and various motion properties of the user's hands. These observed characteristics can also be used to implement a security protocol, for example by identifying authorized users by the anatomical properties of their hands or the behavioral properties exhibited by the user while gesturing.

18 Claims, 29 Drawing Sheets

Related U.S. Application Data continuation of application No. 15/870,023, filed on Jan. 12, 2018, now Pat. No. 11,009,961, which is a division of application No. 13/776,439, filed on Feb. 25, 2013, now Pat. No. 9,880,629.

(60) Provisional application No. 61/602,704, filed on Feb. 24, 2012.

(51) Int. Cl.

| | |
|---|---|
| *G06F 3/042* | (2006.01) |
| *G06F 3/0488* | (2022.01) |
| *G06F 3/04886* | (2022.01) |
| *G06F 21/32* | (2013.01) |
| *G06F 21/83* | (2013.01) |

(52) U.S. Cl.
CPC ........ *G06F 3/0488* (2013.01); *G06F 3/04886* (2013.01); *G06F 21/32* (2013.01); *G06F 21/83* (2013.01); *G06F 2203/04104* (2013.01); *G06F 2221/2101* (2013.01)

(58) Field of Classification Search
CPC .. G06F 21/32; G06F 21/83; G06F 2221/2101; G06F 2203/04104
See application file for complete search history.

(56) References Cited

U.S. PATENT DOCUMENTS

| | | | |
|---|---|---|---|
| 6,515,669 | B1 | 2/2003 | Mohri |
| 6,614,422 | B1 | 9/2003 | Rafii |
| 6,771,294 | B1 | 8/2004 | Pulli et al. |
| 7,042,442 | B1 | 5/2006 | Kanevsky |
| 7,071,924 | B2 | 7/2006 | Wilbrink |
| 7,151,530 | B2 | 12/2006 | Roeber |
| 7,340,077 | B2 | 3/2008 | Gokturk |
| 7,417,681 | B2 | 8/2008 | Lieberman |
| 7,660,444 | B2 * | 2/2010 | Hamalainen ............. G07C 9/37 |
| | | | 382/118 |
| 8,600,166 | B2 | 12/2013 | Adhikari |
| 8,638,989 | B2 | 1/2014 | Holz |
| 8,693,731 | B2 | 4/2014 | Holz |
| 8,799,803 | B2 * | 8/2014 | Amm .................... G06F 3/0216 |
| | | | 715/773 |
| 9,880,629 | B2 | 1/2018 | Moscarillo |
| 10,157,309 | B2 | 12/2018 | Molchanov et al. |
| 11,009,961 | B2 | 5/2021 | Moscarillo |
| 11,755,137 | B2 | 9/2023 | Moscarillo |
| 2002/0006222 | A1 | 1/2002 | Inagaki et al. |
| 2002/0012014 | A1 | 1/2002 | Mohri |
| 2002/0089412 | A1 | 7/2002 | Heger et al. |
| 2002/0188854 | A1 | 12/2002 | Heaven |
| 2003/0132913 | A1 | 7/2003 | Issinski |
| 2003/0174125 | A1 | 9/2003 | Torunoglu et al. |
| 2004/0046744 | A1 * | 3/2004 | Rafii .................... G06F 3/0304 |
| | | | 345/168 |
| 2004/0218070 | A1 | 11/2004 | Hamalainen |
| 2004/0242988 | A1 | 12/2004 | Niwa |
| 2005/0037844 | A1 | 2/2005 | Shum et al. |
| 2006/0202950 | A1 | 9/2006 | Lee |
| 2007/0130547 | A1 | 6/2007 | Boillot |
| 2007/0259717 | A1 * | 11/2007 | Mattice ................. G06F 3/0346 |
| | | | 463/36 |
| 2008/0013826 | A1 * | 1/2008 | Hillis ...................... G06F 3/017 |
| | | | 382/154 |
| 2008/0092245 | A1 | 4/2008 | Alward |
| 2008/0100572 | A1 | 5/2008 | Boillot |
| 2008/0111710 | A1 | 5/2008 | Boillot |
| 2008/0168403 | A1 | 7/2008 | Westerman |
| 2009/0070594 | A1 * | 3/2009 | Kritt ................... G06F 21/6209 |
| | | | 713/189 |
| 2009/0103780 | A1 * | 4/2009 | Nishihara ............. G06F 3/0425 |
| | | | 382/103 |

| | | | |
|---|---|---|---|
| 2009/0135162 | A1 | 5/2009 | Van De Wijdeven et al. |
| 2009/0189858 | A1 | 7/2009 | Lev et al. |
| 2009/0217211 | A1 | 8/2009 | Hildreth et al. |
| 2009/0231252 | A1 * | 9/2009 | Maegawa ............... G06F 21/84 |
| | | | 345/87 |
| 2009/0315740 | A1 | 12/2009 | Hildreth |
| 2010/0205667 | A1 | 8/2010 | Anderson |
| 2010/0231522 | A1 | 9/2010 | Li |
| 2010/0329509 | A1 | 12/2010 | Fahn et al. |
| 2011/0016240 | A1 | 1/2011 | Mills |
| 2011/0041100 | A1 | 2/2011 | Boillot |
| 2011/0110560 | A1 * | 5/2011 | Adhikari ................. G06F 3/017 |
| | | | 382/103 |
| 2011/0119640 | A1 | 5/2011 | Berkes et al. |
| 2011/0129124 | A1 | 6/2011 | Givon |
| 2011/0157016 | A1 | 6/2011 | Chang |
| 2011/0221974 | A1 | 9/2011 | Stern et al. |
| 2011/0320949 | A1 * | 12/2011 | Ohki ........................ G06F 3/017 |
| | | | 715/863 |
| 2012/0030637 | A1 | 2/2012 | Dey et al. |
| 2012/0075194 | A1 * | 3/2012 | Ferren ................ G02B 13/0065 |
| | | | 345/168 |
| 2012/0304260 | A1 * | 11/2012 | Steeves ................. H04L 63/083 |
| | | | 726/5 |
| 2013/0004016 | A1 | 1/2013 | Karakotsios |
| 2013/0076645 | A1 * | 3/2013 | Anantha ............... G06F 3/0488 |
| | | | 345/173 |
| 2013/0159939 | A1 | 6/2013 | Krishnamurthi |
| 2013/0182077 | A1 | 7/2013 | Holz |
| 2013/0182079 | A1 | 7/2013 | Holz |
| 2013/0182897 | A1 | 7/2013 | Holz |
| 2013/0182902 | A1 | 7/2013 | Holz |
| 2013/0275907 | A1 | 10/2013 | Lau |
| 2014/0028861 | A1 | 1/2014 | Holz |
| 2014/0125775 | A1 | 5/2014 | Holz |
| 2014/0125813 | A1 | 5/2014 | Holz |
| 2014/0125815 | A1 | 5/2014 | Holz |
| 2014/0139641 | A1 | 5/2014 | Holz |
| 2014/0177913 | A1 | 6/2014 | Holz |
| 2014/0192024 | A1 | 7/2014 | Holz |
| 2014/0192206 | A1 | 7/2014 | Holz |
| 2014/0192259 | A1 | 7/2014 | Holz |
| 2014/0201666 | A1 | 7/2014 | Bedikian et al. |
| 2014/0201674 | A1 | 7/2014 | Holz |
| 2014/0201683 | A1 | 7/2014 | Holz |
| 2014/0201684 | A1 | 7/2014 | Holz |
| 2014/0201689 | A1 | 7/2014 | Bedikian et al. |
| 2014/0201690 | A1 | 7/2014 | Holz |

FOREIGN PATENT DOCUMENTS

| | | |
|---|---|---|
| JP | 2003256850 A | 9/2003 |
| JP | 2005071208 A | 3/2005 |
| JP | 2007219966 A | 8/2007 |
| JP | 2007538318 A | 12/2007 |
| JP | 2010086014 A | 4/2010 |
| JP | 2011209786 A | 10/2011 |
| WO | 2005114556 A2 | 12/2005 |
| WO | 2010144050 A1 | 12/2010 |
| WO | 2011056731 A2 | 5/2011 |
| WO | 2012048380 A1 | 4/2012 |
| WO | 2013109608 A3 | 10/2013 |
| WO | 2013109609 A3 | 10/2013 |

OTHER PUBLICATIONS

Cardinal D. "Leap Motion: Will It Make You a Magician or Is It Just Handwaving?", www.extemetech.com, accessed, Feb. 12, 2013.
Eisenberg A., "Remote Control, With a Wave of a Had", www. NewYorkTimes.com, accessed Sep. 11, 2011.
European Examination Report dated Jul. 24, 2018 from EP Application No. 13713589.3, 6 pages.
European Search Report, 13713589.3, dated Jul. 14, 2020, 7 pages.
Hartley et al., "Multiple View Geometry in Computer Vision, First Edition," Chapter 8, pp. 219-243, 2000.

(56)                    References Cited

OTHER PUBLICATIONS

International Preliminary Report on Patentability and Written Opinion in corresponding PCT Application No. PCT/US2013/027682, dated Feb. 17, 2015 (14 pages).

International Search Report and Written Opinion received in PCT/US2013/027682 dated Feb. 6, 2015; 21 pages.

Invitation to Pay Additional Fees and Where Applicable, Protest Fee received in PCT/US2013/027682 dated Aug. 8, 2014; 6 pages.

Jain et al., "Machine Vision," Chapter 11, pp. 289-308, 1995.

Japanese Office Action for JP Application No. 2014-558932 dated Jan. 10, 2017; 10 pages.

Office Action received in JP Application No. 2014-558932 dated Jan. 10, 2017; 10 pages.

Oikonomidis et al., "Efficient Model-Based 3D Tracking of Hand Articulations using Kinect," University of Greece—Computer Science Department, 2001.

Prince et al., "Pattern Recognition and Machine Vision: Stereo Vision and Depth Reconstruction," University College London—Computer Science Department, 2006.

Rothganger et al. "3D Modeling and Recognition Using Local Affine-Invariant Image Descriptors and Multi-View Spatial Constraints", International Journal of Computer Vision, vol. 66 No. 3, 2006, (pp. 231-259).

Sibley et al., "Stereo Observation Models," University of Southern California, Jun. 16, 2003.

Su at al., "Towards an EMG-Controlled Prosthetic Hand Using a 3-D Electromagnetic Positioning System," IEEE Transactions on Instrumentation and Measurement, vol. 56, No. 1, Feb. 2007.

\* cited by examiner

*FIG. 3*

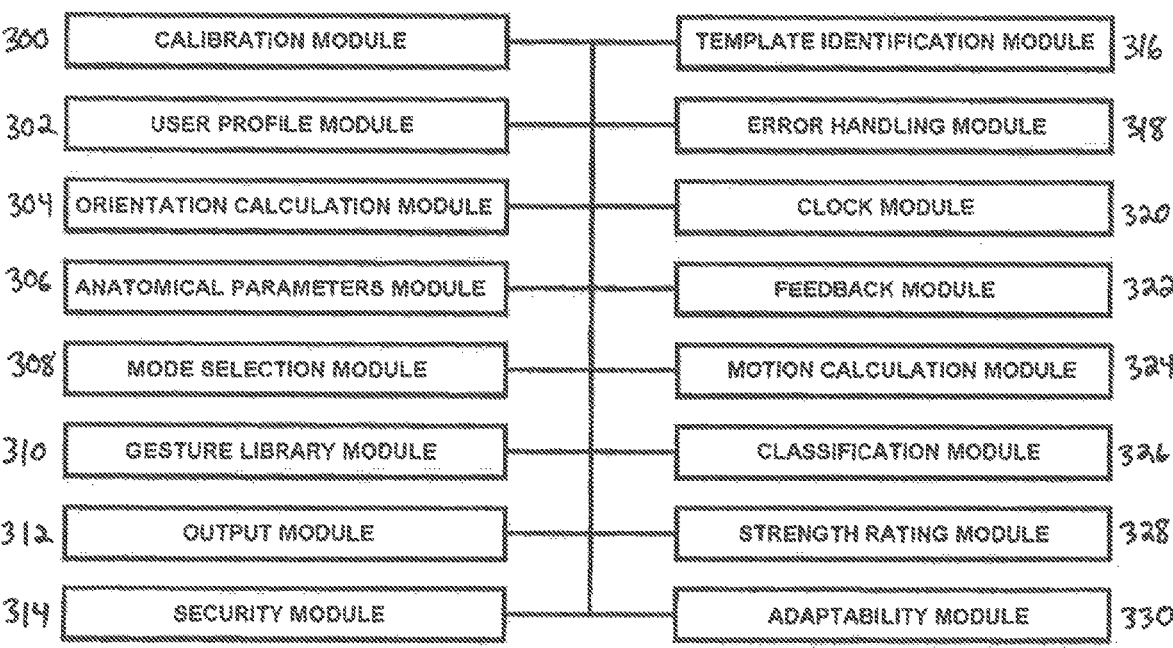

300 CALIBRATION MODULE

302 USER PROFILE MODULE

304 ORIENTATION CALCULATION MODULE

306 ANATOMICAL PARAMETERS MODULE

308 MODE SELECTION MODULE

310 GESTURE LIBRARY MODULE

312 OUTPUT MODULE

314 SECURITY MODULE

TEMPLATE IDENTIFICATION MODULE 316

ERROR HANDLING MODULE 318

CLOCK MODULE 320

FEEDBACK MODULE 322

MOTION CALCULATION MODULE 324

CLASSIFICATION MODULE 326

STRENGTH RATING MODULE 328

ADAPTABILITY MODULE 330

FIG. 8C
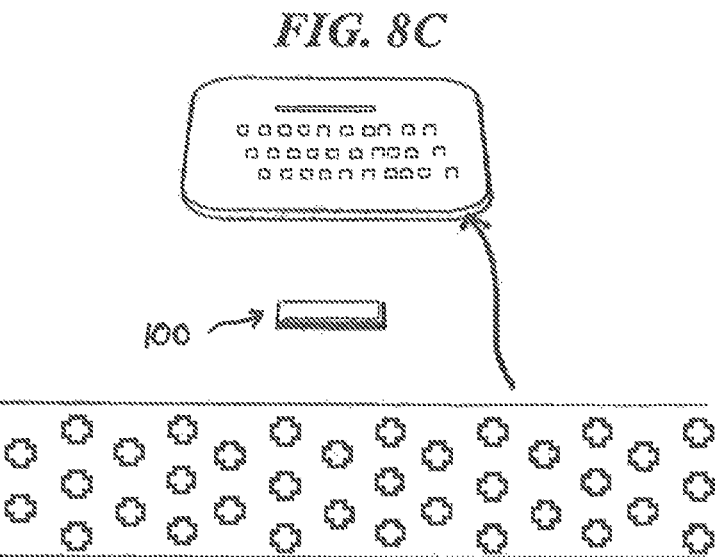
FIG. 8D
FIG. 8E
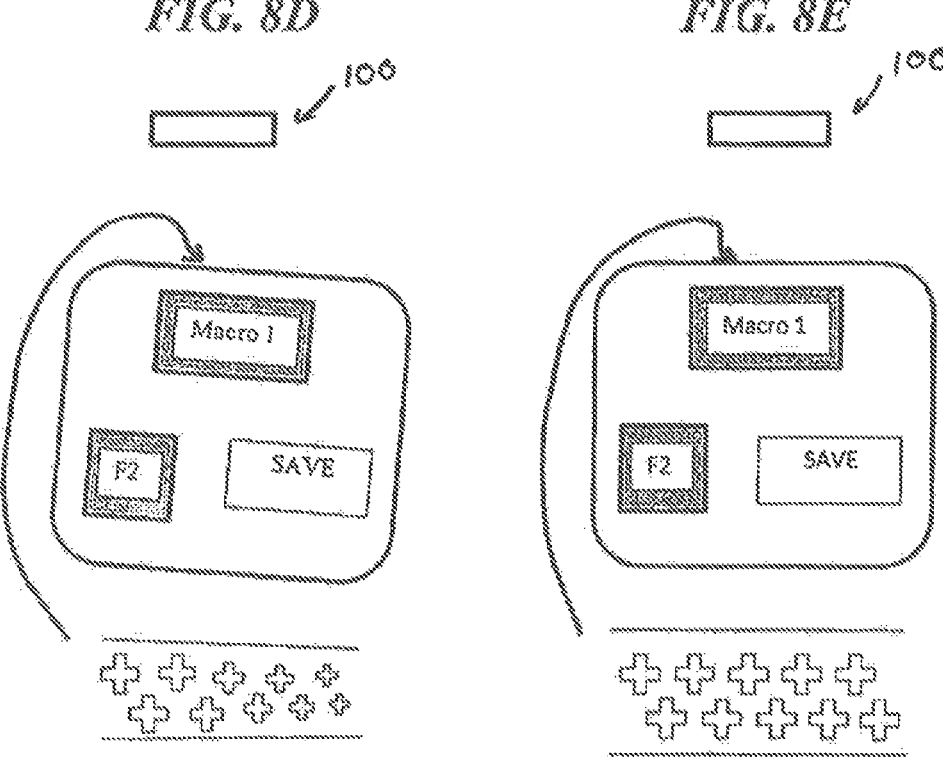

Angular Acceleration - Degree/Second/Second   (Angle-D1S1 to Core to D1S2)

Linear Velocity

Linear Acceleration

Horizontal Velocity

Horizontal Acceleration

Vertical Velocity

Vertical Acceleration

S1000    DEVICE POWER-ON

S1002    INITIALIZATION

S1004    AUTHENTICATE USER

S1006    ORIENTATION CALCULATION

S1008    X, Y, AND Z CALCULATION

S1010    MOVEMENT CALCULATION

S1012    DETECT OPERATING MODE

S1014    CLASSIFY GESTURES

S1016    GENERATE OUTPUT

GESTURE RECOGNITION DEVICES AND METHODS

RELATED APPLICATIONS

This application claims priority as a continuation to U.S. patent application Ser. No. 17/322,556, filed on May 17, 2021, which claims priority as a continuation to U.S. patent application Ser. No. 15/870,023, filed on Jan. 12, 2018 and issued as U.S. Pat. No. 11,009,961, which claims priority as a divisional application to U.S. patent application Ser. No. 13/776,439, filed on Feb. 25, 2013 and issued as U.S. Pat. No. 9,880,629, which claims priority to U.S. Provisional App. No. 61/602,704, filed on Feb. 24, 2012, each of which is hereby incorporated by reference in its entirety.

FIELD

The present invention relates to gesture recognition and, in particular, to gesture recognition input devices for digital data processing systems and related methods.

BACKGROUND

Traditionally, human interaction with digital data processing systems (e.g., personal computers, desktop computers, laptop computers, tablet computers, server computers, cell phones, PDAs, gaming systems, televisions, set top boxes, radios, portable music players, and the like) required physical manipulation of one or more input devices such as a keyboard or mouse. These systems present a number of ergonomic issues, as the user is required to conform to the fixed geometry of the device. For example, traditional input devices have fixed or limited button sizes, which can make interaction with such devices awkward and/or error prone, especially for those with larger or smaller hands. Traditional input devices can also increase the weight and size of the digital data processing system, thereby reducing portability and user convenience. Moreover, physical acquisition can be ungainly, while the frequent shifting between devices (e.g., between a keyboard, number pad, and mouse) can cause a user to not only physically reset but also to perform mental tasks that can be consciously or unconsciously disruptive to the user's thought process and concentration.

Moreover, traditional input devices can present a number of security challenges. First, unless the system is secured (e.g., by a password that must be entered prior to access), a non-authorized user could use a conventional input device to access the associated digital data processing system. Further, even if the system is password-protected, the traditional input device could be vulnerable to unscrupulous third parties who could readily observe keystrokes as a password is entered. Finally, the conventional input device is essentially a passive device that most often provides a one-time gating function with no independent ability (e.g., apart from recognizing a password) to distinguish between a truly authorized system user and an imposter, either at the time of entry of the password, for example, or continually while the user continues accessing the system.

Various "virtual keyboard" input devices have been proposed, however, these too suffer from a number of disadvantages. For example, such systems rely primarily on detecting only the tip of the user's finger and calculating the fingertip's velocity in order to determine when a "key" strike occurs. Such systems also generally rely on a static model in which virtual keys are assigned to fixed locations within a workspace. Accordingly, such systems focus on the point of impact between a user's fingertip and a surface that defines the workspace. In practice, however, data regarding the fingertip's velocity at a fixed virtual location is insufficient to achieve the level of accuracy that users need and/or expect from an input device. Moreover, these systems essentially lock the user into a fixed geometry that presents the same ergonomic issues posed by traditional mechanical keyboards as discussed above, for example. Further, such systems generally function only in a keyboard mode, or lack a convenient and non-disruptive way to switch between available input modes. An exemplary virtual keyboard input device is disclosed in U.S. Pat. No. 6,614,422 to Rafii et al., entitled "METHOD AND APPARATUS FOR ENTERING DATA USING A VIRTUAL INPUT DEVICE," the entire contents of which are incorporated herein by reference.

In view of the foregoing, there is a need for improved input devices for digital data processing systems.

SUMMARY

The present teachings generally relate to devices and methods for detecting and interpreting gestures made by a user so as to generate user input information for use by a digital data processing system. By detecting characteristics of the user's hands and/or various motion properties of the user's hands in an observed workspace, the exemplary methods and systems provided herein can reliably interpret the user's various gestures as inputs (e.g., keyboard inputs, mouse inputs, etc.) for the digital data processing system. The observed characteristics can also be used to implement a security protocol, for example, by identifying authorized users via the anatomical properties of a user's hands and/or the behavioral properties exhibited by the user while gesturing. Additional object and/or predefined patterns thereon can be identified and provide additional information and options for interaction with the device.

In one aspect of the present teachings, an input device for a digital data processing system is provided that includes at least one sensor that observes a workspace and generates data indicative of one or more parameters of an input agent within the workspace, and a processor that identifies gestures made by the agent from the data generated by the sensor(s) and that generates user input information based on the identified gestures. The user input information generated by the processor can represent various types of information such as one or more of keyboard input information, pointing device input information, and number pad input information, all by way of non-limiting example.

Sensors for use in accord with the present teachings can have a variety of configurations. By way of non-limiting example, one or more sensors can utilize optical imaging (e.g., image processing), infrared light, structured light, and time-of-flight detection to observe the workspace. For example, a single sensor can generate data indicative of the distance and/or orientation of portions of the input agent within the workspace in three-dimensions using time-of-flight signals and/or structured light (e.g., infrared light and infrared sensor, RGB camera), for example. Further, exemplary systems can comprise multiple sensors and/or multiple types of sensors used in combination. For example, a primary sensor can observe the workspace from a first perspective and a secondary sensor of the same or different modality, that can be spaced a distance apart from the first sensor, can observe the workspace from a second perspective different from the first perspective. In some aspects, the primary sensor can comprise a structured light sensor, the secondary sensor comprises a camera, and the data generated by the primary and secondary sensors can be combined to generate a more robust representation of the workspace and the input agent's interaction therewith. In some aspects, the various perspectives of a first and second sensor can together generate a three-dimensional stereoscopic understanding of the workspace In various aspects, the processor can be configured to generate the user input information without requiring physical user contact with the input device.

In some aspects, the processor can detect landmarks of the agent (e.g., specific features, patterns) within the scope of the workspace. For example, the agent can comprise a user's hand and the landmarks detected by the processor can be at least one of a finger, a finger segment, a finger shape, a finger joint, a finger nail, a skin surface contour, and a hand surface. In some aspects, the one or more parameters of the agent comprise a size of the agent, a color of the agent, a surface texture of the agent, a position of the agent, and an orientation of the agent (e.g., the orientation of one or more portions of a user's hand). In various aspects, the processor can calculate changes in at least one of the parameters of the agent.

In various aspects of the present teachings, the workspace comprises a surface adjacent to the input device and/or a three-dimensional space within the field of view of the at least one sensor. For example, the workspace can comprise a surface on which the input device is positioned and/or a frontal 180 degree arc extending from the input device. In some aspects of the present teachings, the workspace that can be observed by the one or more sensors can be based on the position and/or number of sensors. By way of example, the at least one sensor can comprise a plurality of sensors positioned around the perimeter of the workspace, the workspace comprising a region framed by the plurality of sensors. In some embodiments, for example, the sensor(s) can be positioned in the center of a workspace and outward-facing so as to generate a 360 degree spherical workspace.

In some aspects of the present teachings, the processor can associate gestures made by the agent with one or more input candidates such as alphanumeric characters, punctuation marks, symbols, or functional elements, all by way of non-limiting example. In an embodiment where the processor of the input device represents keyboard input information, for example, the input candidate can provide a function like that typically associated with a specialty key or function key such CTRL, ALT, Page Up, and Page Down.

In various embodiments, the agent can comprise one or more hands, each of the one or more hands comprising a plurality of fingers. In such an exemplary embodiment, the input device can be operable in a plurality of operating modes and the processor can be configured to set a current operating mode based at least in part on at least one of a location of the one or more hands, a gesture made by the one or more hands, and a configuration of the one or more hands. By way of example, the plurality of operating modes can comprise a keyboard input mode, a pointing device input mode, a number pad input mode, a template-based input mode, and a custom pad input mode. In some aspects, for example, the processor can set the current operating mode to the pointing device input mode when only one of the plurality of fingers is extended. Alternatively, for example, the processor can set the current operating mode to the keyboard input mode when the processor detects a threshold number of digits within the workspace. In some aspects, the processor can set the current operating mode to the number pad input mode when the processor detects movement of one of the one or more hands to a position laterally offset from a home position or when the processor detects that only one of the one or more hands is presented to the workspace. In some aspects, the processor can set the current operating mode to the custom pad input mode when the processor detects movement of one of the one or more hands to a position laterally offset from a home position or when the processor detects that only one of the one or more hands is presented to the workspace. In some aspects, the processor can be configured to set a template-based input mode based at least in part on the identification of a template and/or object (e.g., tool, stylus, etc.) within the workspace.

In some aspects, the input devices can include a configuration module that assigns particular user input information to a particular gesture such that the processor generates the particular user input information when the particular gesture is detected. By way of example, a user's particular gesture such as a pinching motion where by the index finger and thumb are brought together or apart from one another can be associated with a particular action such as zooming in or out, respectively. Such associations can be pre-defined and/or assigned by the user. In various aspects, the configuration module displays a gesture strength indicator based on a degree to which the particular gesture can be reliably detected.

In accordance with various aspects of the present teachings, an input device for a digital data processing system is provided that includes at least one sensor for generating data indicative of a workspace and a processor. The processor additionally includes a user profile module that identifies a plurality of anatomical landmarks of a user's hand based on the data generated by the sensor(s) and determines the locations of the landmarks within the workspace, a motion detection module that compares the data generated by the sensor over time to generate a set of values indicative of changes in said landmarks, and a classification module that associates changes in the landmarks with user input information.

The motion detection module can compare a variety of data to generate values indicative of changes in the landmarks. By way of example, the motion detection module can compare one or more of a distance traveled, a velocity, and an acceleration of a particular landmark to at least one of a distance traveled, a velocity, and an acceleration of at least one other landmark such that the classification module can generate user input information based on said comparison. In some aspects, for example, the motion detection module can measure changes in distance of landmarks relative to a starting position and the classification module can associate such measurements with user input information. Alternatively or in addition, the motion detection module can measure changes in velocity and/or acceleration of landmarks. In some aspects, the motion detection module can measure, for example, changes in an angular relationship of at least two landmarks. In some embodiments, for example, the motion detection module can measure an angular displacement of an angle defined by a vertex and at least two landmarks. Alternatively or in addition, the motion detection module can measure an angular velocity and/or angular acceleration of an angle defined by a vertex and at least two landmarks.

In some aspects, the processor can additionally include an orientation module that establishes a core value for the user's hand, the core value indicating a position of the core of the user's hand within the workspace, for example, based on the observed position and/or orientation of various anatomical landmarks of a user's hand.

In some aspects, systems and methods in accord with the present teachings can additionally utilize a physical template located within the observed workspace and with which the user can physically interact and/or manipulate. In related aspects, the input device can additionally include a template identification module that determines the presence and position of an object or template within the workspace based on data generated by the at least one sensor and identifies the object or template, for example, based on at least one characteristic of the object, and/or a pattern or marking on the template. Accordingly, alternatively or in addition to associating changes in one or more landmarks relative to one another, the classification module can associate changes in landmarks relative to the template, with user input information being associated with the template.

In one aspect of the present teachings, an input device for a digital data processing system is provided that includes at least two sensors spaced a distance apart from one another that observe a workspace and generates data indicative of the workspace from at least a first and second perspective. The input device can additionally include a processor having a user profile module that identifies a plurality of anatomical landmarks of a user's hand as indicated by the data generated from the at least two sensors to determine a location of the landmarks within the workspace. Additionally, the processor can include an orientation calculation module, which calculates a core value that indicates the position of the core of the user's hand within the workspace, and a motion calculation module that compares the data generated by the plurality of sensors over time to generate a first set of values indicative of distance traveled, velocity, and acceleration of said landmarks. The processor can also include a classification module that associates gestures made by the user's hand within the workspace with user input information based on the first set of values.

By way of example, an input device for a digital data processing system can be provided that includes first and second cameras spaced a distance apart from one another that capture two-dimensional images of a workspace from first and second perspectives, respectively, and a processor. The processor can include a user profile module that identifies a plurality of anatomical landmarks of a user's hand within the images (e.g., using image processing) and determines a location of said landmarks within the workspace. Based on the data generated by the various cameras at different perspectives, an orientation calculation module can calculate a core value for the user's hand and the motion calculation module can generate a first set of values indicative of two-dimensional distance traveled, velocity, and acceleration of said landmarks. Additionally, the motion calculation module can convert the first set of values to a second set of values indicative of three-dimensional distance traveled, velocity, and acceleration of said landmarks. Based on the second set of values, a classification module can then associate gestures made by the user's hand within the workspace with user input information.

In some embodiments, the motion calculation module can additionally generate a third set of values indicative of angular displacement, angular velocity, and angular acceleration (e.g., of an angle having a vertex and having a first ray extending from the vertex to a first landmark of the plurality of landmarks and a second ray extending from the vertex to a second landmark of the plurality of landmarks). In some aspects, the classification module can additionally use this third set of values to associate gestures made by the user's hand within the workspace with user input information.

In one aspect of the present teachings, a method of authenticating a user of a digital data processing system is provided that includes using at least one sensor to generate data indicative of one or more parameters of a user in a workspace, determining gesture information indicative of a gesture made by the user within the workspace based on the data, and comparing the gesture information to known gesture information particular to the user (e.g., predetermined gesture information) to determine whether the user is an authorized user of the digital processing system. In various aspects, the workspace can comprise a surface adjacent to the digital data processing system, a frontal 180 degree arc extending from the digital data processing system, and/or a surface on which the digital data processing system is positioned.

In various aspects, the gesture information can comprise changes in configuration of the user's hand during entry of a code (e.g., entry of an alpha-numeric code or string of numbers). By way of example, the gesture information can comprise a speed, a cadence, or a style of the user's hand movement during entry of a code. Additionally, in various aspects, the method can include repeating the detecting and comparing steps each time a hand enters the workspace to determine whether the hand belongs to an authorized user of the digital data processing system. Alternatively or in addition, the processor can continuously or intermittently compare the observed gesture information with the known gesture information particular to the user to ensure that the hand belongs to the authorized user.

In some aspects, methods of authenticating a user of a digital data processing system can further comprise determining one or more parameters of the user based on the data, and comparing the determined parameter to a predetermined value(s) to determine whether the user is an authorized user of the digital data processing system. In various aspects, the parameter can be at least one of an anatomical geometry of a portion of the user, a color of the portion of the user, and a surface texture of the portion of the user (e.g., segments of the hand). Moreover, the detecting and comparing steps can be repeated each time a user enters the workspace to determine whether the user continues to be an authorized user of the digital data processing system. Alternatively or in addition, the processor can continuously or intermittently compare the parameter with the predetermined value to ensure that the hand belongs to the authorized user.

In accord with some aspects of the present teachings, a system for determining whether a user is an authorized user of a digital data processing system is provided that includes one or more sensors that detect gestures made by the user within a workspace and that generate gesture information indicative of the detected gestures, and a processor that compares the generated gesture information to predetermined gesture information stored in a storage medium, the processor determining whether the user is an authorized user based on a degree to which the generated gesture information matches the predetermined gesture information.

As discussed otherwise herein, the sensors can have a variety of configurations. For example, in some aspects, the one or more sensors can be configured to detect the gestures made by the user without requiring physical user contact with the sensors. By way of example, in some embodiments, the one or more sensors can comprise first and second cameras and the generated gesture information can comprise images of the workspace captured by the first and second cameras. In related embodiments, the processor can detect landmarks of the user within the images of the workspace.

Exemplary landmarks include a finger, a finger segment, a finger shape, a finger joint, a finger nail, a skin surface contour, and a hand surface.

In accord with some aspects of the present teachings, a system for recognizing an authorized user of a digital data processing system is provided that includes at least one sensor that detects at least one physical characteristic of an input agent's hand, and a processor that compares the detected physical characteristic to predetermined characteristic information stored in a storage medium, the processor determining whether the user is an authorized user based on a degree to which the detected physical characteristic matches the predetermined characteristic information.

In various aspects, the at least one sensor can utilize one or more of optical imaging, RGB, infrared light, structured light, and time-of-flight detection to detect at least one physical characteristic of the user's hand. By way of example, the at least one sensor can comprise first and second cameras and the detected physical characteristic can be detected from images of a workspace in which the agent's hand is positioned, the images being captured by the first and second cameras.

The present invention further provides devices, systems, and methods as claimed.

BRIEF DESCRIPTION OF THE DRAWINGS

The invention will be more fully understood from the following detailed description taken in conjunction with the accompanying drawings, in which:

FIG. 1I is a schematic illustration of another exemplary embodiment of a gesture recognition input device, in which the input device frames a workspace;

FIG. 3 is a schematic diagram of exemplary modules that can be included in the control unit of FIG. 2;

FIG. 8C depicts an exemplary keyboard template in accord with various aspects of the present teachings;

FIG. 8D depicts an exemplary special function keypad template having a pattern disposed thereon in accord with various aspects of the present teachings;

FIG. 8E depicts the exemplary special function keypad template of FIG. 8D disposed at a different orientation that that of FIG. 8D relative to an exemplary sensor;

DETAILED DESCRIPTION

Figure 1A:
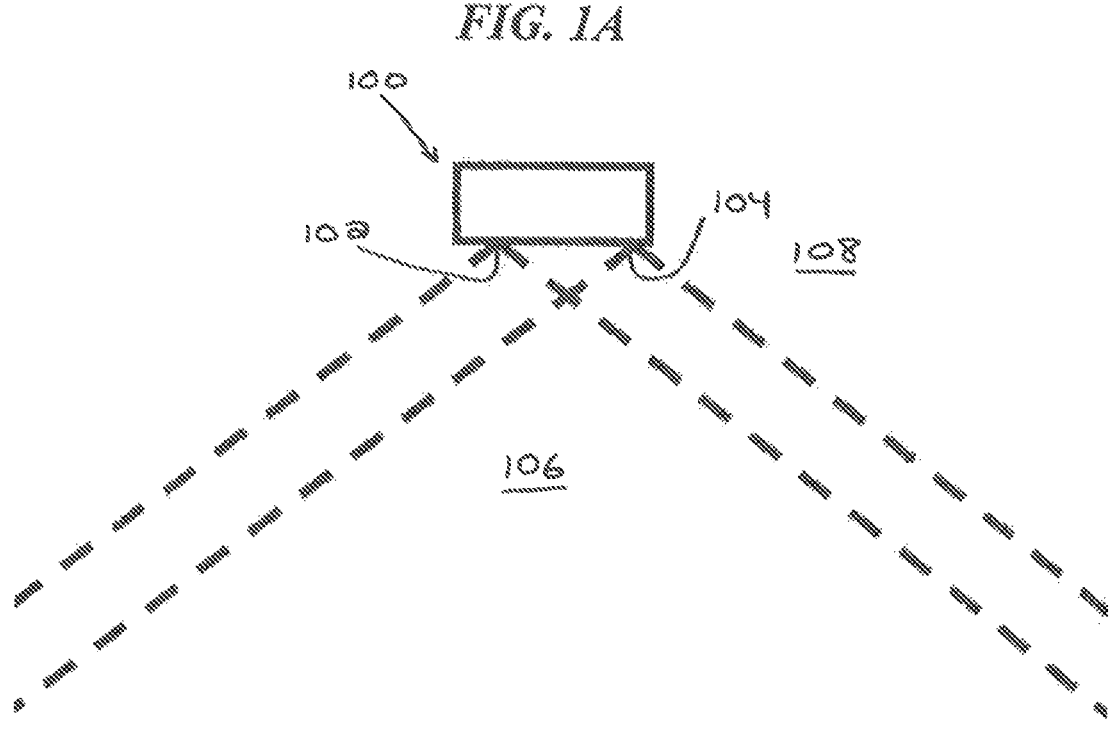
FIG. 1A is a schematic top view of one exemplary embodiment of a gesture recognition input device resting on a surface.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

To the extent that any of the material in the references incorporated herein conflicts with the disclosure of this application, the disclosure of this application controls.

Devices and related methods are disclosed herein that generally involve detecting and interpreting gestures made by a user to generate user input information for use by a digital data processing system. In various embodiments, the exemplary devices include one or more sensors that observe a workspace in which a user performs gestures and a processor that can interpret the data generated by the sensors as various user inputs. In various aspects, a user's gestures, which includes for example the configuration of the user's hands, can be used to set the device to various input modes that can affect the manner in which the data generated by the sensors is interpreted. By way of example, the device can be set to a keyboard input mode, a number pad input mode, a mouse input mode, or other, customizable input mode, for example, based on the configuration of the user's hands (e.g., the presence and/or position of the user's dominant and non-dominant hands relative to one another). Subsequent gestures made by the user can thus be interpreted as keyboard inputs, number pad inputs, mouse inputs, etc., using observed characteristics of the user's hands and various motion properties of the user's hands. These observed characteristics can also be used to implement a security protocol, for example, by identifying authorized users using the anatomical properties of their hands and/or the behavioral properties exhibited by the user while gesturing (e.g., while typing in a password or continually or intermittently during use).

Additionally, input devices in accord with various aspects of the present teachings can reduce the chance of interruption in mental focus and concentration as the user is not required to switch between traditional input devices such as a keyboard, a number pad, and a mouse by providing a unique transition that does not require the user to locate and acquire a new physical device. Furthermore, input devices in accord with various aspects of the present teachings can include an orientation component that can ascertain the location of the user's hands in relation to one another and in relation to the input device using a core calculation that based on the various segments of a user's hands. In some aspects, this core calculation can provide a single variable based on the observed data that can be used to fine tune many of the other calculations necessary to dependably and accurately reflect the user's intent. Moreover, systems and methods in accord with the present teachings can also allow tremendous freedom for the user to make adjustments to their hand positions, thus helping to prevent fatigue, repetitive stress injuries, and other ergonomic concerns. For example, the exemplary input devices disclosed herein can offer the user a non-restrictive experience in which they are freed from the rigid confines of a fixed input apparatus, and can measure specifically some or all of the user's finger segments, finger joints, and finger nails to generate a robust positional calculation for X, Y, and Z coordinates of each of these anatomical landmarks. In various aspects, such accurate measurements of a particular user's motions might not only be useful to identify the task intended to be performed by the particular user, but also help develop a data warehouse containing quintessential patterns across a broad range of users for a particular action. Rather than relying solely on velocity, input devices in accord with the present teachings can account for a plurality of motion variables including vertical distance, vertical velocity, vertical acceleration, horizontal distance, horizontal velocity, horizontal acceleration, angular displacement, angular velocity, angular acceleration, and so forth, all by way of non-limiting example. Some or all of these features can be combined to provide an input device with a degree of accuracy that is superior to existing systems.

System Generally

FIGS. 1A-1I illustrate exemplary embodiments of a gesture recognition input device 100 that incorporates various aspects of the present teachings.

Sensors

Gesture recognition input devices in accord with various aspects of the present teachings generally include one or more sensors for observing a workspace and/or generating data indicative of one or more parameters of an object or input agent present in that workspace (e.g., a user's hand(s), a template, etc.), generally without requiring physical contact between the input agent and the input device. By way of non-limiting example, the sensor(s) can generate data indicative of location, velocity, acceleration, angular displacement, and so forth, of the object in the workspace that can be used to calculate distance and/or orientation of portions of the object within the workspace, as discussed in greater detail below. Indeed, the sensor(s) can have a variety of configurations and orientations and can operate under a variety of detection modalities.

Figure 1B:
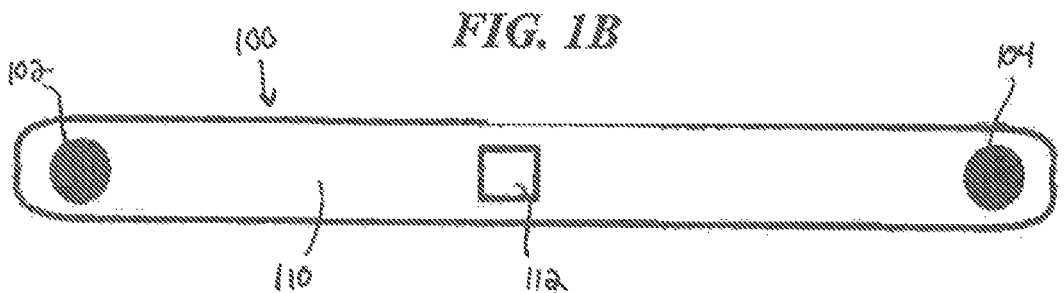
FIG. 1B is a side view of the gesture recognition input device of FIG. 1A.

As shown in FIGS. 1A and 1B, for example, the device 100 can include first and second sensors 102, 104 for detecting the presence of objects (e.g., a user's hands) within a workspace 106, and can detect motion of such objects. Though two sensors 102, 104 are shown in the illustrated embodiment, it will be appreciated that the device 100 can also have only one sensor, or can include more than two sensors. For example, the exemplary device 100 depicted in FIG. 1D includes only a single sensor 104. On the other hand, the exemplary device 100 depicted in FIG. 1F includes three sensors 102, 103, 104.

Figures 1C, 1D, 1E, 1F:
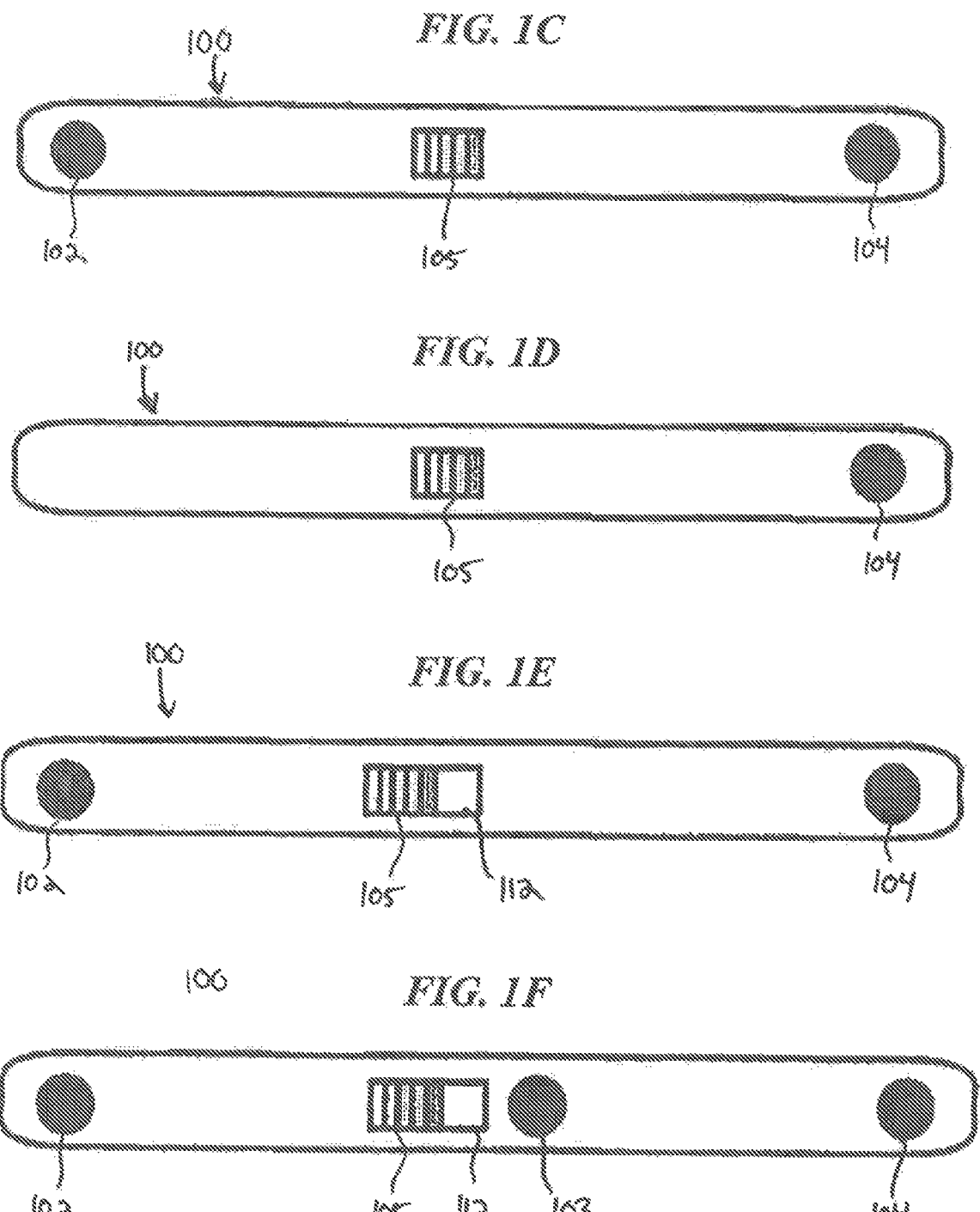
FIG. 1C is a side view of one exemplary embodiment of a gesture recognition input device having two structured light sensors.
FIG. 1D is a side view of another exemplary embodiment of a gesture recognition input device having a structured light sensor.
FIG. 1E is a side view of another exemplary embodiment of a gesture recognition input device having a camera and a structured light sensor.
FIG. 1F is a side view of another exemplary embodiment of a gesture recognition input device having a camera and two structured light sensors.
Figure 1G:
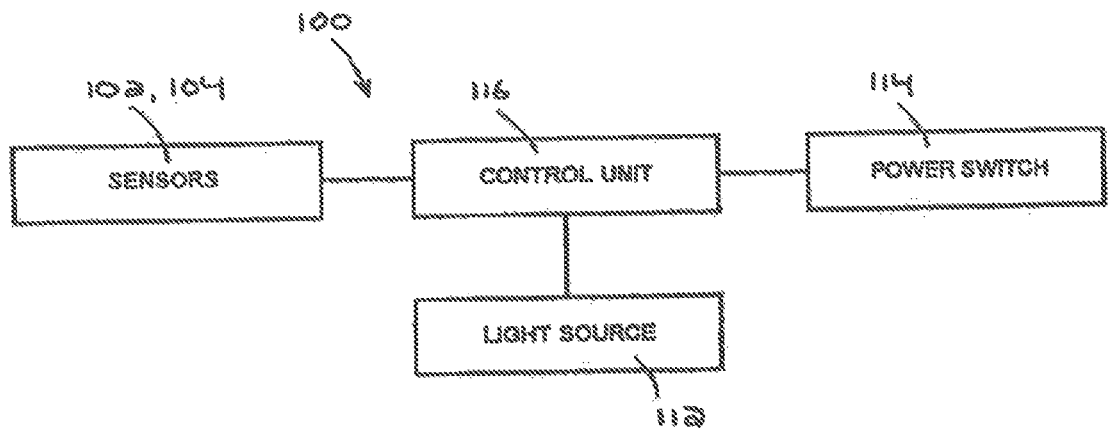
FIG. 1G is a schematic diagram of the gesture recognition input device of FIG. 1A.
Figure 1H:
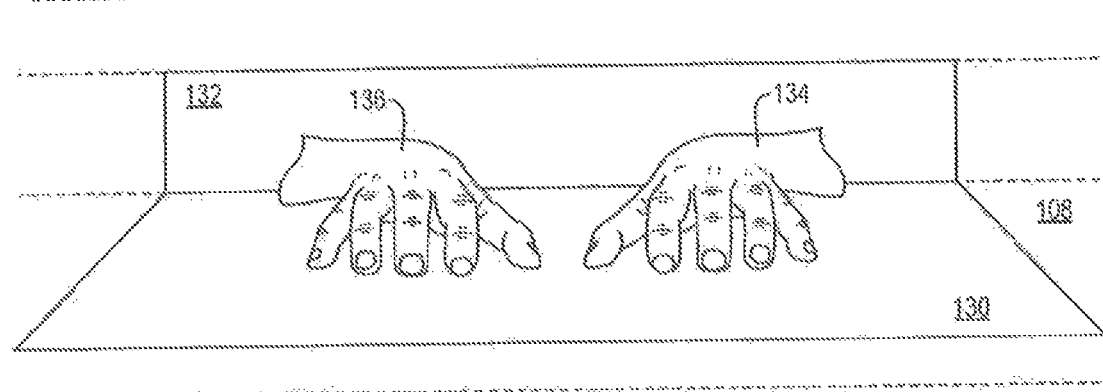
FIG. 1H is a schematic illustration of an active zone and a zone of interest from the perspective of the sensor(s) of the device of FIG. 1A.

Sensors for use in accord with the present teachings can employ any of a variety of sensor technologies or combinations of sensor technologies known in the art or hereafter developed and modified with the present teachings to observe the workspace including, for example, optical imaging (e.g., visible light cameras), infrared detection, structured light detection, and time-of-flight detection. Indeed, exemplary systems can comprise multiple sensors and/or multiple types of sensors. For example, by combining the data generated by multiple sensors that individually generate two-dimensional images (e.g., an RGB sensor, a CCD camera), a stereo three-dimensional "image" can be obtained of the workspace. Three-dimensional modalities can also be used. For example, by utilizing infrared light to cast a known pattern (e.g., lines, bars, dots, shapes) on the workspace, an IR sensor can capture a three-dimensional image based on the way that the patterned or "structured" light is shaped and/or bent when projected onto the object. Based on the changes in the structure or pattern of the projected light, a three-dimensional understanding of the object can be obtained. It should also be appreciated that the projected light can alternatively comprise known patterns of phase-shifted light or visible light (e.g., a pattern of colored light) that can be projected into the workspace and detected by a sensor in accord with the teachings herein. FIG. 1D, for example, depicts a device 100 having a single structured infrared light sensor 104 (as well as a structured infrared light source 105). Alternatively, as described above with reference to two spaced-apart CCD cameras, multiple IR sensors can be placed a distance apart from one another so as to provide a more accurate representation of the object being captured (e.g., in the case of occlusion), as shown for example in FIG. 1C. Additionally, in various embodiments, multiple sensors of various modalities can be incorporated into a single device as to provide additional data regarding objects in the workspace.

For example, whereas in the embodiment depicted in FIGS. 1A and 1B, the first and second sensors 102, 104 are both in the form of cameras (e.g., CCD-based imaging devices) having respective optics for capturing an image from a field of view, the exemplary devices depicted in FIGS. 1C, 1E, and 1F additionally or alternatively utilize at least one structured infrared light source 105 and one or more infrared sensors. For example, the exemplary device 100 depicted in FIG. 1C includes two structured infrared sensors 102, 104 that are configured to detect the interaction of the structured light generated by the infrared light source 105 with one or more objects in the workspace. Alternatively, the exemplary devices depicted in FIGS. 1E and 1F include multiple sensor types. FIG. 1E, for example, depicts a device 100 having one camera (e.g., CCD-based imaging sensors) 102 and one structured infrared light sensor 104 (as well as a structured infrared light source 105). FIG. 1F, on the other hand, depicts a device having one camera (e.g., CCD-based imaging sensors) 103 and two structured infrared light sensors 102, 104 (as well as a structured infrared light source 105) that are mounted on a surface of the device 100 facing the workspace and/or user.

With reference again to FIGS. 1A and 1B, the sensors 102, 104 are mounted on a surface 110 of the device 100 that extends substantially perpendicularly from a table, desk, or other work surface 108 on which the device 100 is rested, such that the sensors 102, 104 are aimed in the direction of a user. In this configuration, the collective field of view of the two sensors 102, 104 defines a workspace 106 that extends outward from the device 100 in an approximately 120 degree arc from each sensor. In some embodiments, the workspace 106 can extend in a broader or narrower arc, e.g., 90 degrees, 160 degrees, 180 degrees, etc. The workspace 106 is three-dimensional, in that it also extends vertically upwards from the surface 108 on which the device 100 is placed. Accordingly, the workspace 106 can be logically divided into a number of zones, as shown for example in FIG. 1H. An "active zone" 130 can be defined as the area in which the user interacts with the surface 108 on which the device 100 is resting (or a plane extending from the device in instances in which the device 100 is not resting on a surface). In addition, a "zone of interest" 132 can be defined as the area above the active zone 130 (e.g., the area that is further away from the surface 108 on which the device 100 is resting than the active zone 130). As discussed below, the zone of interest 132 can be monitored to help classify certain user gestures, actions, or behaviors. In some embodiments, the active zone 130 can remain fixed relative to the device 100 and the sensors 102, 104, while the zone of interest 132 can move with (e.g., follow) the user's hands 134, 136. In other words, if one or both of the user's hands 134, 136 move and become askew to the sensors 102, 104, the left and/or right portions of the zone of interest 132 can likewise move. As such, the ability of the sensors 102, 104 to track the user's gestures within the workspace, whether in the user's interaction with a surface or in space (e.g., above a surface), can reduce user fatigue and increase usability by allowing the user to shift their hand position for optimum comfort and/or allow the device 100 to be used in a variety of environments. By way of example, in various mobile environments, the user may not be presented with a surface that enables a stable interaction therewith. Regardless, the sensors may nonetheless track the user's gestures within the workspace and enable identification of the user's gestures to generate user input information, as otherwise discussed herein. On the other hand, if a suitable surface is presented to the user and the user is so inclined, the user can rest a portion of their body (e.g., wrists) on the surface to reduce fatigue without interfering with the sensors ability to observe the user's gestures above the surface and/or their interaction with the surface.

It will be appreciated that the quantity of sensors, and/or the sensor positions and orientations, can be selected to provide a workspace having any of a variety of sizes and shapes. For example, the arc of the workspace 106 can be as small as 1 degree and as large as 360 degrees (e.g., by positioning sensors on more than one side of the device 100). In some embodiments, the device 100 can have an awareness of the distance between the sensors 102, 104 (i.e., the distance between the sensors can be "known"), such that data generated by the sensors can be combined for subsequent processing.

While the presence of a physical work surface 108 within the workspace 106 is generally contemplated herein, the device 100 can also be used in any space, including those in which the workspace 106 does not include any surface. In addition, the term surface as used herein can refer to a physical surface or a virtual surface (e.g., a virtual plane). Also, while a frontal sensor perspective is described herein, the device 100 can also have other sensor perspectives. For example, as shown in FIG. 1I, the device 100' can be positioned such that the sensors 102' frame a rectangular workspace 106' such as a white board, desktop, tabletop, display, wall, etc., thereby allowing the user's hands or other objects being manipulated by the user within the workspace 106' to be viewed from a plurality of sides. It will further be appreciated based on the present teachings that the workspace can have any shape based on the ability of the sensor(s) to detect objects therein. By way of example, one or more sensor(s) can be positioned in the center of a workspace and outward-facing so as to generate a 360 degree spherical workspace surrounding the sensors.

Light Source

As discussed above, the sensing modality itself may require the projection of light into the workspace. By way of example, each of the devices 100 depicted in FIG. 1C-1F utilize an infrared light source 105 to generate a known pattern (e.g., horizontal or vertical lines, bars, dots, shapes) of infrared light on the workspace or a visible light source to generate a pattern of colored bars, for example, thereby allowing the one or more sensors to capture the way in which the patterned light is shaped and/or bent when projected onto the object. The light source 105 can have a variety of configurations for illuminating the workspace. For example, the structured infrared light source 105 can be positioned adjacent the IR sensor, or alternatively, can be disposed a distance therefrom.

With reference now to FIGS. 1B, 1E, and 1F, the device 100 can additionally or alternatively include a light source 112 for illuminating at least a portion of the workspace 106. This can be particularly advantageous when one or more visible light cameras are used as a sensor and the device 100 is used in an environment characterized by low ambient light levels. Any of a variety of light sources can be used, such as LEDs or incandescent bulbs. It will be appreciated that data captured by the sensors (e.g., sensors 102, 104 in FIG. 1B) can be processed to determine the lighting conditions in which the device 100 is being used and therefore to control whether the light source 112 is used and the intensity of the light source 112.

It will also be appreciated in light of the teachings herein, that in various embodiments, a light source can be configured to project a display visible to the user onto the surface. Such a projection could be used to aid in calibration of the device 100 (e.g., by having the user interact with the surface in a specific manner as otherwise discussed herein), and/or aid novice or unskilled typists, for example, by displaying a visual representation of a keyboard onto the surface. Similarly, in various aspects, the projected light could identify specific portions of the workspace by color and/or shape that are indicated as corresponding to a particular desired user input. For example, as discussed in detail below, a user could assign customized meanings to various gestures as they relate to these projected light patterns.

Power Switch

The device can also include a power on/off switch 114, which can be a software switch or a hardware switch mounted on the exterior of the device 100. In some embodiments, depressing the power switch 114 for an extended time period (e.g., three seconds) can power the device 100 on or off, whereas depressing the power switch 114 for a short time period (e.g., one second or less) can trigger an escape or reset operation. The power switch 114 can also be used to cause the device to enter or exit one or more operating modes, such as standby, sleep, hibernate, wake, etc.

Control Unit

Figure 2:
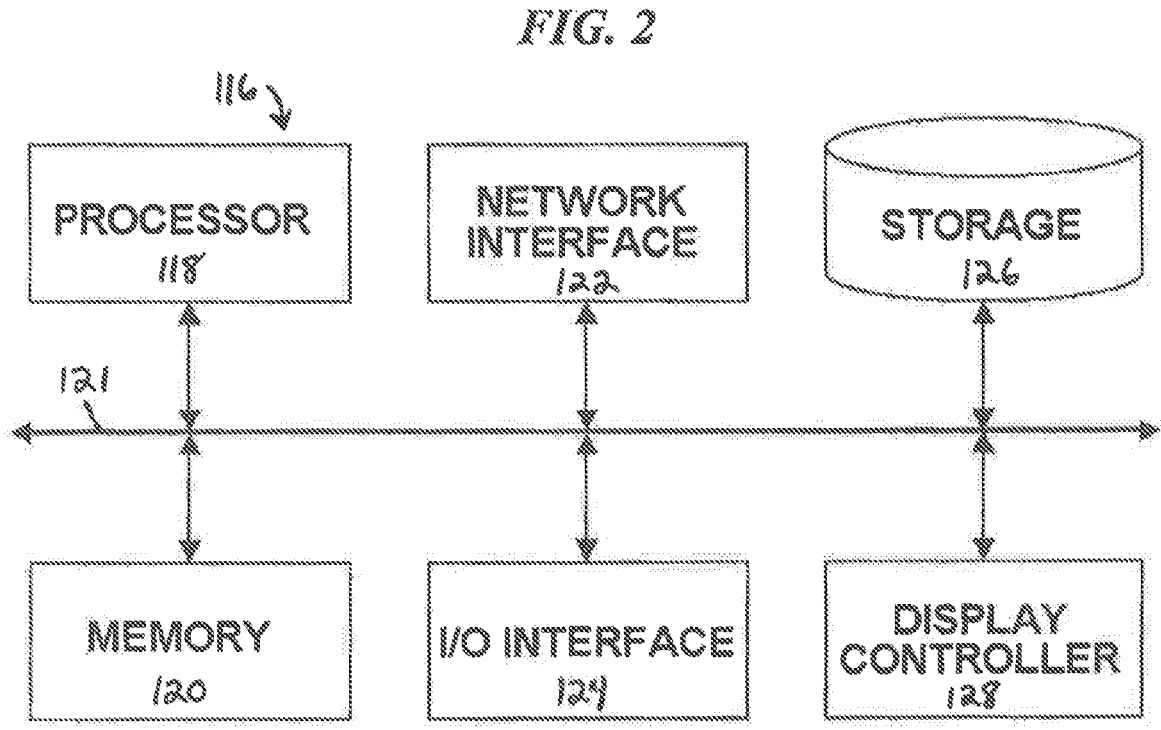
FIG. 2 is a schematic diagram of a control unit for use with a gesture recognition device as shown in FIG. 1A.

The device can also include a control unit 116 (which can also be generally referred to as a "processor") for controlling the various elements of the device 100, processing inputs to the device 100, and generating outputs of the device 100. FIG. 2 illustrates one exemplary architecture of the control unit 116. Although an exemplary control unit 116 is depicted and described herein, it will be appreciated that this is for the sake of generality and convenience. In other embodiments, the control unit may differ in architecture and operation from that shown and described here.

The illustrated control unit 116 includes a processor 118 which controls the operation of the device 100, for example by executing an operating system (OS), device drivers, application programs, and so forth. The processor 118 can include any type of microprocessor or central processing unit (CPU), including programmable general-purpose or special-purpose microprocessors and/or any one of a variety of proprietary or commercially-available single- or multi-processor systems. The control unit 116 can also include a memory 120, which provides temporary or permanent storage for code to be executed by the processor 118 or for data that is processed by the processor 118. The memory 120 can include read-only memory (ROM), flash memory, one or more varieties of random access memory (RAM), and/or a combination of memory technologies. The various elements of the control unit 116 are coupled to a bus system 121. The illustrated bus system 121 is an abstraction that represents any one or more separate physical busses, communication lines/interfaces, and/or multi-drop or point-to-point connections, connected by appropriate bridges, adapters, and/or controllers.

The exemplary control unit 116 also includes a network interface 122, an input/output (IO) interface 124, a storage device 126, and a display controller 128. The network interface 122 enables the control unit 116 to communicate with remote devices (e.g., digital data processing systems) over a network. The IO interface 124 facilitates communication between one or more input devices (e.g., the sensors, a template, a GPS or other location identifying unit, user command button(s)), one or more output devices (e.g., the light source 112, a computer screen, television, user's cell phone or tablet, a graphical display of the virtual keyboard, etc.), and the various other components of the control unit 116. For example, the first and second sensors 102, 104 can be coupled to the IO interface 124 such that sensor readings can be received and processed by the processor 118. The storage device 126 can include any conventional medium for storing data in a non-volatile and/or non-transient manner. The storage device 126 can thus hold data and/or instructions in a persistent state (i.e., the value is retained despite interruption of power to the control unit 116). The storage device 126 can include one or more hard disk drives, flash drives, USB drives, optical drives, various media disks or cards, and/or any combination thereof and can be directly connected to the other components of the control unit 116 or remotely connected thereto, such as over a network. The display controller 128 includes a video processor and a video memory, and generates images to be displayed on one or more displays in accordance with instructions received from the processor 118.

The various functions performed by the device 100 can be logically described as being performed by one or more modules of the control unit 116. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules.

In use, the device 100 can detect and/or interpret physical gestures made by a user within the workspace 106, and generate corresponding user input information for use by one or more digital data processing systems to which the device 100 is coupled (e.g., personal computers, desktop computers, laptop computers, tablet computers, server computers, cell phones, PDAs, gaming systems, televisions, set top boxes, radios, portable music players, and the like). The device 100 can be a standalone or external accessory that is operably coupled to the digital data processing system, for example using a USB or other communications interface. Alternatively, one or more components of the device 100 can be formed integrally with the digital data processing system. For example, the device 100 can be built into a cellular phone such that when the cellular phone is rested face-up on a table, first and second sensors 102, 104 positioned on a bottom surface of the cellular phone are aimed towards a user seated at the table.

Modules

FIG. 3 is a schematic diagram of exemplary control unit modules of one exemplary embodiment of a gesture recognition input device 100.

Calibration Module

In various embodiments, the device 100 can include a calibration module 300 for initially calibrating the device 100 to a particular user. The calibration module 300 can calculate the dimensions and properties of each segment, joint, nail, etc. of the user's fingers and hands, and can calculate motion variables as the user performs a calibration routine. Exemplary calibration variables include without limitation vertical distance, vertical velocity, vertical acceleration, horizontal distance, horizontal velocity, horizontal acceleration, angular displacement, angular velocity, angular acceleration, and so forth.

The calibration module 300 can walk a user through a calibration protocol, for example using visible or audible cues instructing the user to perform various calibration gestures. In one embodiment, the device 100 can be packaged with a calibration template to assist with the calibration procedure. FIG. 4 illustrates one exemplary embodiment of a calibration template 400, which can be in the form of a 20" by 24" sheet of paper or cardboard. The template 400 includes a device outline 402 and a representation 404 of a QWERTY keyboard. The keyboard's 404 home keys 406 are outlined, and the "S" and "L" keys 408, 410 are highlighted. A zigzag line 412 is also provided on the template 400, along with two horizontal lines 414, 416.

Figure 4A:
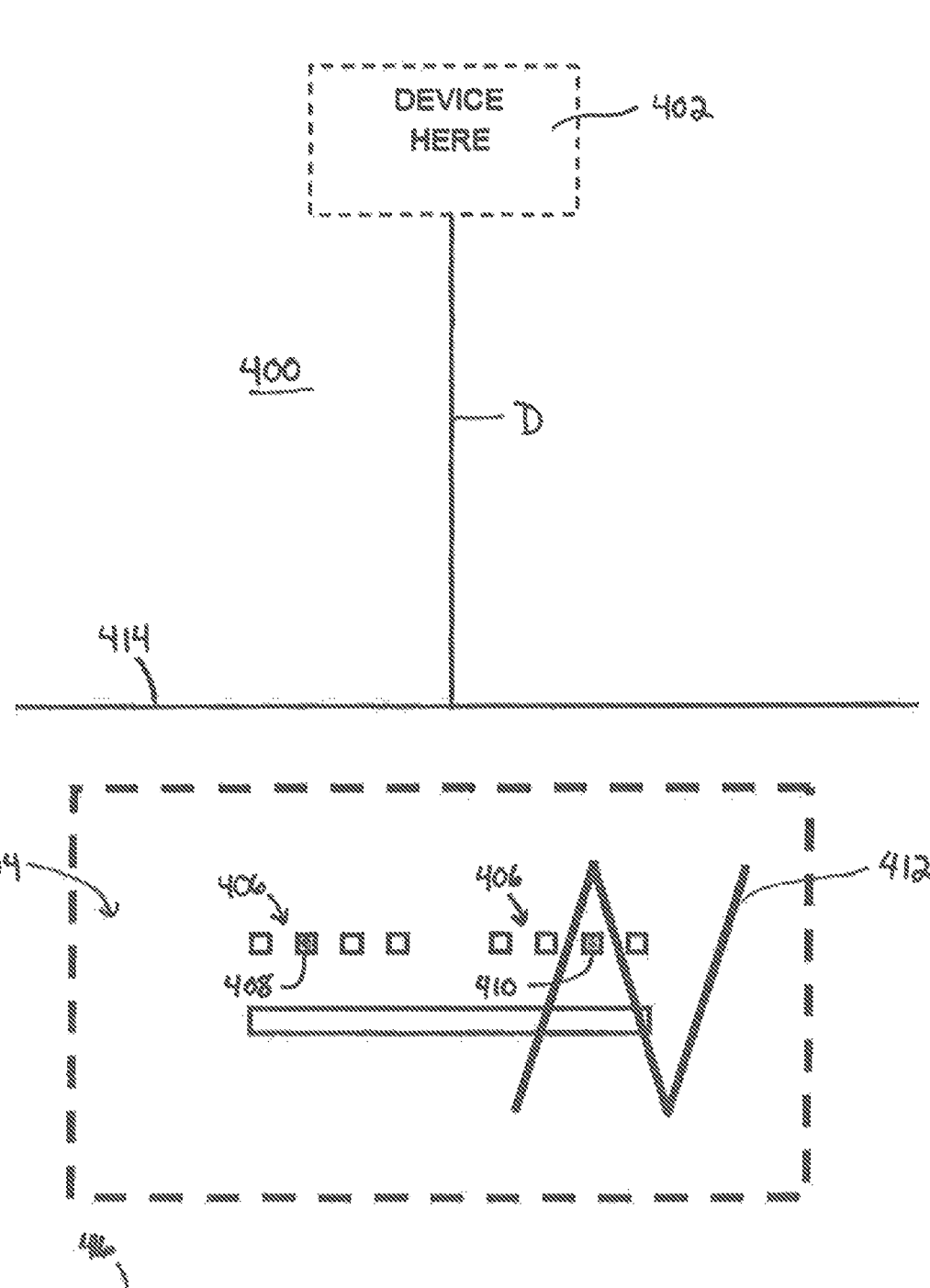
FIG. 4A depicts one exemplary embodiment of a calibration template for use with a gesture recognition input device.
Figure 4B:
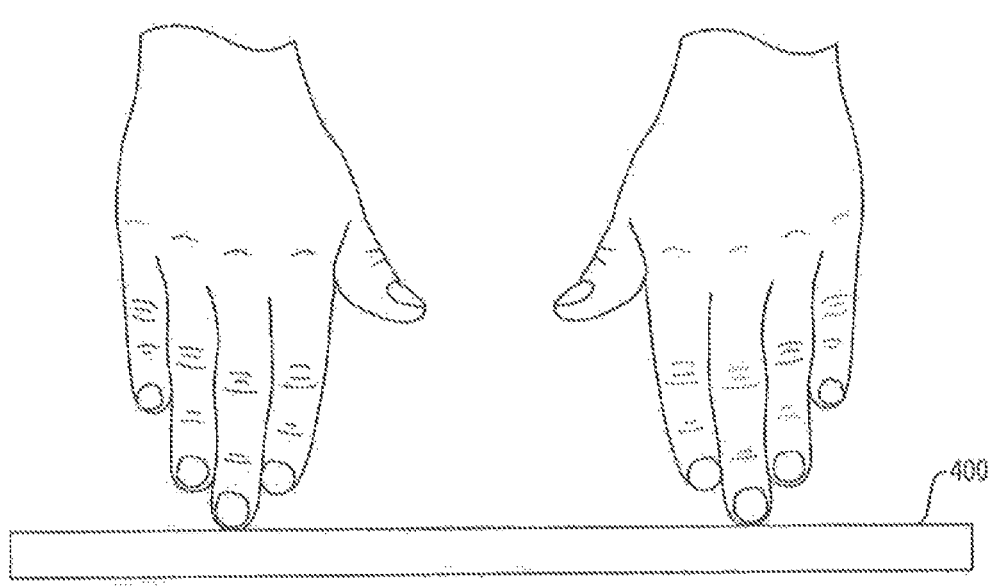
FIG. 4B depicts a user's hands in a "stand" position during one exemplary embodiment of a calibration procedure.
Figure 4C:
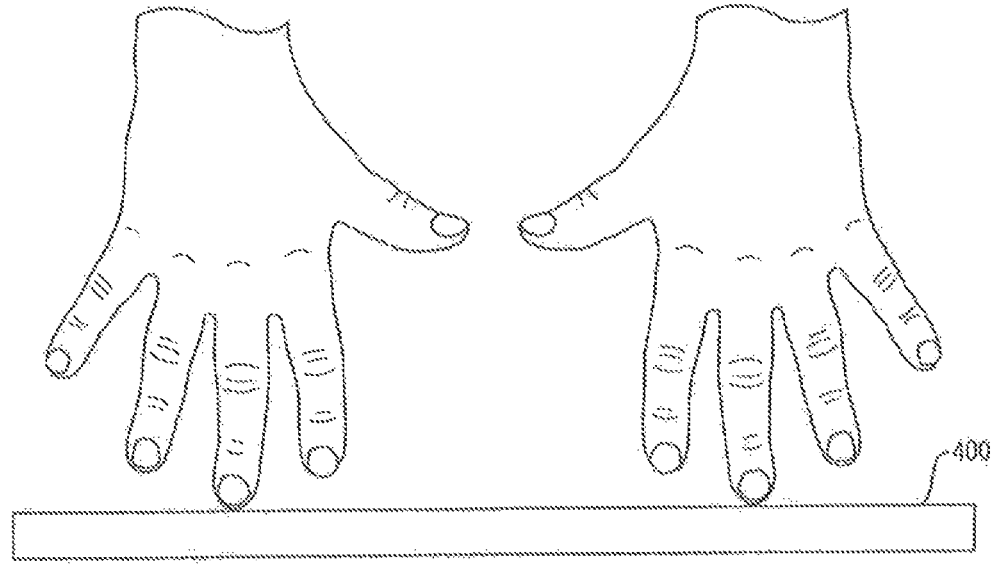
FIG. 4C depicts a user's hands in a "spread stand" position during one exemplary embodiment of a calibration procedure.

In an exemplary calibration routine, the template 400 is placed on a flat surface 108 and the device 100 is placed in the marked device outline 402. The user is then instructed to place their hands in a "stand" position, e.g., as shown in FIG. 4B, in which the user's fingers are completely straight and touching one another and in which the tip of the user's left middle finger is placed on the highlighted "S" key 408 and the tip of the user's right middle finger is placed on the highlighted "L" key 410, such that the user's fingers and hands extend perpendicularly upwards from the template plane 400. The user is then instructed to transition to a "spread stand" position, e.g., as shown in FIG. 4C, which is identical to the "stand" position except that the user's fingers are spread apart from each other. During these steps, the device 100 can measure the absolute length and width of the user's fingers, hands, and the various parts thereof, relying in part on a known distance D between the template's device outline 402 and the template's keyboard representation 404. In one embodiment, this known distance D can be 18. During subsequent operation of the device 100, the size of a digit or digit segment detected by the sensors 102, 104 can be compared to the size data obtained during the calibration phase with the known distance D. This can allow the device 100 to estimate the current distance between the digit or digit segment and the sensors 102, 104.

Figure 4D:
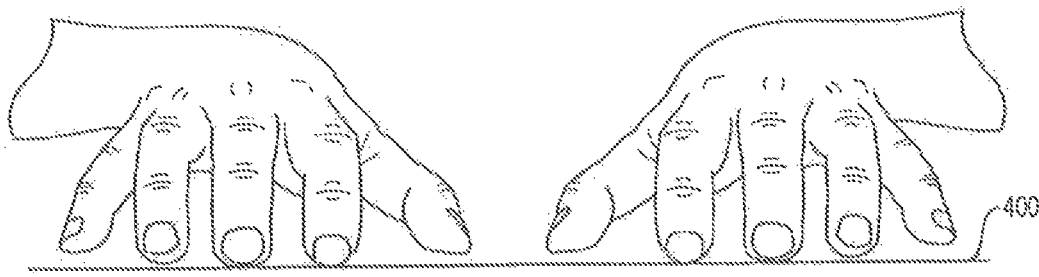
FIG. 4D depicts a user's hands in a "ready" position during one exemplary embodiment of a calibration procedure.

Next, the user can be instructed to place their hands in a "ready" position, e.g., as shown in FIG. 4D, in which the user's finger tips are placed on the home keys 406 of the template while the user's fingers are bent to position the user's palms face down towards the template plane 400. During this stage of the calibration routine, the device 100 can confirm the anatomical dimensions measured earlier and begin performing an orientation calculation, as discussed below with respect to the orientation calculation module 304.

The user can then be prompted to type a predetermined text string or sentence on the keyboard representation 404 of the template 400. As the user types out the text string, the device 100 can perform orientation and length calculations, calculate a strength rating, and build a movement and behavior profile, as discussed below.

The calibration routine can also instruct the user to assume a "mouse hand position" (e.g., curling d2, d3, d4 underneath and that the index finger of the dominant hand or the hand that the user prefers to use to operate a mouse is extended). The user is then instructed to trace the zigzag line 412 with the tip of the extended index finger. During this phase of the calibration routine, the device 100 can perform 3 dimensional calculations and establish a frame of reference in the Z direction (e.g., the direction extending perpendicular to the device surface 110 in which the sensors 102, 104 are mounted and parallel to the template plane 400, along which the user's hands can move in towards the sensors 102, 104 or out away from the sensors). Next, while maintaining the "mouse hand position," the user can be instructed to trace the two horizontal lines 414, 416 with the extended index finger. This phase of the calibration routine allows the device 100 to establish a frame of reference in the X direction (e.g., the direction extending perpendicular to the Z direction and parallel to the template plane 400, along which the user's hands can move left and right relative to the sensors 102, 104) and in the Y direction (e.g., the direction extending perpendicular to the template plane 400, along which the user's hands can move up and down relative to the sensors 102, 104). This phase can also allow the device 100 to refine its frame of reference in the Z direction.

User Profile Module

In various aspects, systems in accord with the present teachings can acquire and/or store information related to a particular user (e.g., a library of data particular to a user). By way of example, once a calibration routine is completed, a user profile module 302 can store user profile information unique to the particular user who completed the calibration routine. This can allow the user to use the device 100 again in subsequent sessions without repeating the calibration procedure, essentially making the calibration procedure a one-time exercise for each user. Additionally or alternatively (e.g., in the case in which a calibration routine is not performed), the user profile module can acquire and/or store information particular to a user through the user's interaction with the system. Such stored information could relate, for example, to the user's anatomical features and/or commonly-used gestures, actions, or behavioral patterns. Though the user profile module is discussed as being particular to a specific user, in various embodiments, the data associated with a particular user profile could be shared, for example, to allow for approved secondary users or for the population of a classification module across various users.

In various aspects, the user profile information can be used to authenticate users of the device, as described below. For example, with reference now to FIGS. 5A-5B, the system can map each segment of a user's hands to a coordinate system specified by a hand (left or right), a digit (D1 through D5), and a segment (S1 through S4). Thus, the tip of a user's right index finger can be referred to as their right D1S1, and the base of the user's left pinky finger can be referred to as their left D4S3. The system can also map each joint of a user's hands to a coordinate system specified by a hand (left or right), a digit (D1 through D5), and a joint (J1 through J3).

In the illustrated embodiment, the distal phalange is mapped to S1, the distal interphalangeal joint (DIP) is mapped to J1, the middle phalange is mapped to S2, the proximal interphalangeal joint (PIP) is mapped to J2, the proximal phalange is mapped to S3, the metacarpophalangeal joint (MP) is mapped to J3, and the metacarpal is mapped to S4. More precisely, the skin overlying the dorsal aspect of each of these anatomical features is mapped to the indicated reference coordinates.

The system can also map each fingernail of a user's hands to a coordinate system specified by a hand (left or right) and a fingernail (N1 through N5). It will be appreciated that each fingernail typically comprises a cuticle, a lunula, and a nail plate, each of which can be detected by the device 100.

Figure 5A:
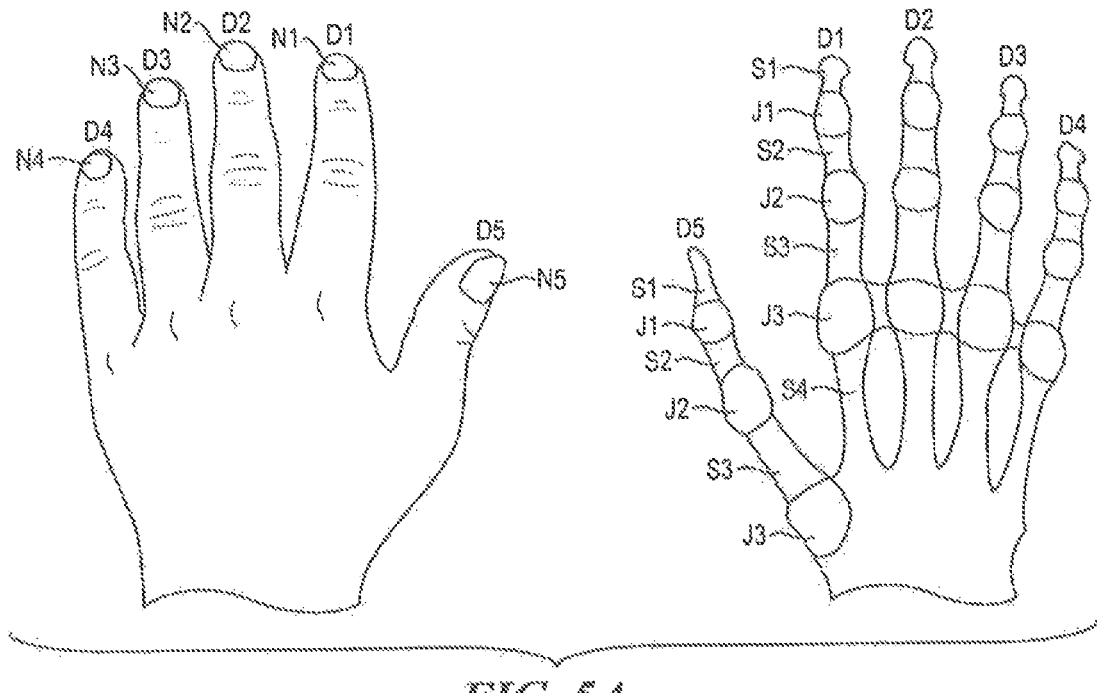
FIG. 5A is a schematic illustration of a coordinate system that can be used to specify particular portions of one or more human hands.
Figure 5B:
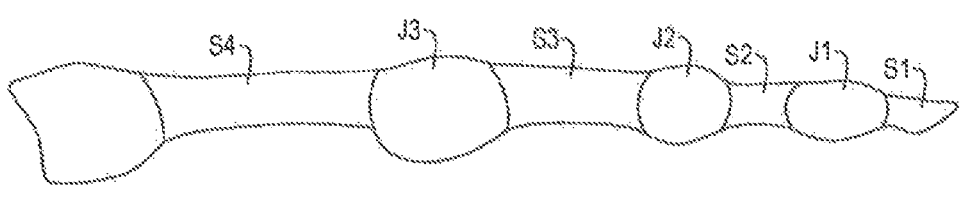
FIG. 5B is a schematic illustration of the coordinate system of FIG. 5A as applied to a single digit.

User profile information can include any of a variety of properties of the user's hands, such as the size and shape of each of the various elements shown in FIGS. 5A-5B and the relative positions of each of the elements. User profile information can also include various properties of the user's nails, knuckles, scars, tattoos, wrinkles, and so forth. Information indicative of the color and/or texture of the user's skin can also be stored as user profile information.

Figure 5C:
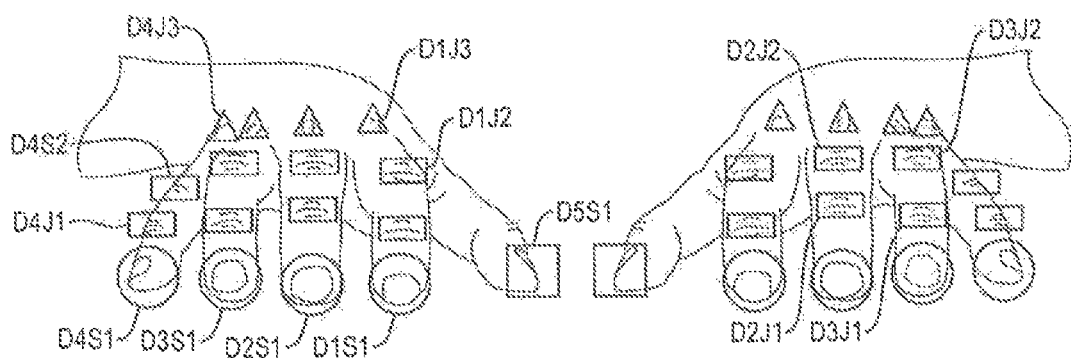
FIG. 5C is a schematic illustration of two hands as seen from the perspective of the sensor(s) of the device of FIG. 1A showing exemplary anatomical landmarks which can be identified by the device.

In addition to the physical properties of the user's hands discussed above, the user profile module 302 can also be configured to store user profile information related to a user's tendency to perform particular actions in a particular manner (e.g., patterns, cadence, speed, typing style, and so forth). Thus, the user profile could include data obtained during normal use or during a calibration procedure regarding commonly-used gestures, actions, or behavioral patterns. As shown in FIG. 5C, for example, the data generated over time can be processed to determine which data points (e.g., components of the user's hands) are detectable in the workspace and to determine the location of said data points within the image. By way of example, in the case where one or more of the sensors comprise imaging sensors, any of a variety of image processing techniques known in the art can be employed to perform such processing, for example as disclosed in Rothganger et al., "3D OBJECT MODELING AND RECOGNITION USING LOCAL AFFINE-INVARI-ANT IMAGE DESCRIPTORS AND MULTI-VIEW SPA-TIAL CONSTRAINTS," International Journal of Computer Vision 66(3), 231-259, 2006, the entire contents of which are incorporated herein by reference. The data acquired from such processing can be compared with data obtained at different time points to calculate, for example, various motion properties of each specific data point, such as vertical distance, vertical velocity, vertical acceleration, horizontal distance, horizontal velocity, horizontal acceleration, angular displacement, angular velocity, angular acceleration, and so forth, and to determine any behavioral patterns that can be stored in the user profile module 302.

Orientation Calculation Module

Figure 5D:
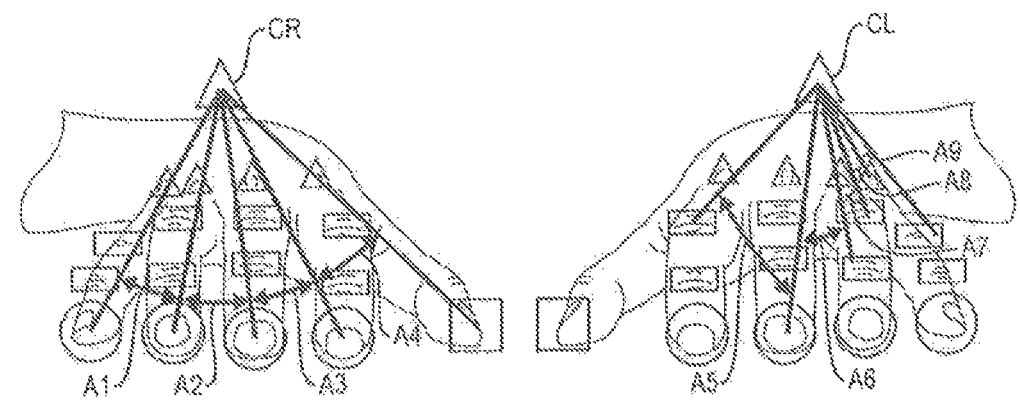
FIG. 5D is a schematic illustration of two hands as seen from the perspective of the sensor(s) of the device of FIG. 1A showing exemplary core positions which can be calculated by the device of FIG. 1A and exemplary angles which can be measured by the device of FIG. 1A.
Figure 5E:
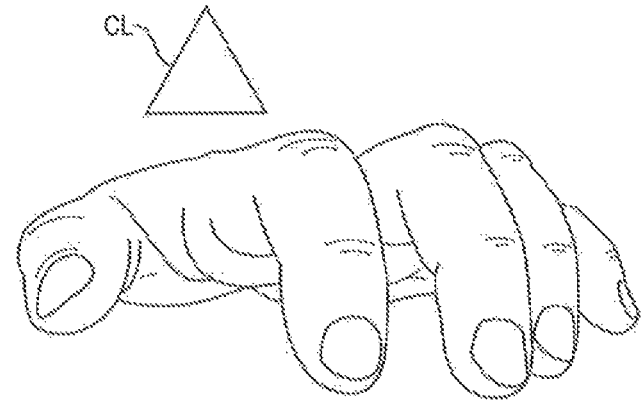
FIG. 5E is a schematic illustration of a left hand from the perspective of a sensor of the device of FIG. 1A.

In various aspects, the device 100 can also include an orientation calculation module 304 that uses information acquired by the calibration module 300 during a calibration protocol and/or information particular to a user (e.g., a non-calibrated user) obtained through the user's interaction with the system during use so as to determine the positional and orientational relationship of the user's hands to one another and to the device 100. The orientation calculation module 304 can use anatomical parameters, specific user dimensions, angles, movements, and various other data to derive one or more values used in subsequent calculations. By way of example, the orientation calculation module can calculate a "core" value that represents the center of the dorsum of the hand and can be used to determine hand rotation and/or to distinguish between an entire hand moving and just one finger on a hand extending or retracting. In FIGS. 5D-5E, for example, the core location CR of the right hand and the core location CL of the left hand are shown as shaded triangles. The core value can also help differentiate vibrations introduced by the user (e.g., a hand tremor) from vibrations introduced by a common environment of the user and the device 100 (e.g., if both are traveling in a vehicle on a bumpy road). In some aspects, the core value can also contribute to the movement calculations performed by the motion calculation module 324 discussed below, for example by fine tuning X, Y, and Z data. The core value can also contribute to the classification determinations made by the classification module 326, as discussed below. The core value can be continuously recalculated and adjusted during operation of the device 100 such that the user can alter their hand position during continued use, thereby increasing user comfort while minimizing or eliminating health issues such as fatigue and repetitive stress disorders that can be caused by being forced to keep the user's hand in the same stance for extended periods.

In one embodiment, the core value can be calculated using measurements of the angle between various components of the user's hands. For example, as shown in FIG. 5D, the orientation calculation module 304 can measure any of a variety of angles A1 through A9. The illustrated angles A1 through A9 are merely exemplary, and it will be appreciated that angles can be measured between any of the joints or segments of the user's hands and fingers to calculate a left hand core location CL and a right hand core location CR.

As shown in FIG. 5D-5E, angles formed by a core location CL, CR and any two segments, joints, or nails of the user's hands can be used to determine the hand's orientation relative to the device 100. The orientation calculation can be factored into the motion and classification processing discussed below to allow the device 100 to be used with a broad range of hand orientations and to adapt in real time to changes in hand orientation. Thus, the device 100 does not suffer from the constraints and ergonomic issues associated with traditional fixed-geometry mechanical keyboards and with fixed-geometry virtual keyboards.

Anatomical Parameters Module

The device 100 can also include an anatomical parameters module 306 which stores one or more rules based on the physical constraints of human hands, including their skeleton structure, muscles, and joints. Along with providing a foundation from which the calculations are based, this information can be used to improve device accuracy, for example by adjusting or discarding as spurious any sensor readings that indicate hand positions which are physically impossible. Moreover, when the sensor's view of the entire workspace is occluded, for example, by various portions of the user's hand, the anatomical parameters module 306 can provide information to assist in the determination of a gesture based on one or more observable data points.

Mode Selection Module

The device can also include a mode selection module 308 configured to switch the device 100 between a plurality of operating modes. Exemplary operating modes include a keyboard input mode, a number pad input mode, and a mouse input mode. The mode selection module 308 can determine the desired operating mode by evaluating any of a variety of parameters, such as the user's hand position.

Figures 6A, 6B:
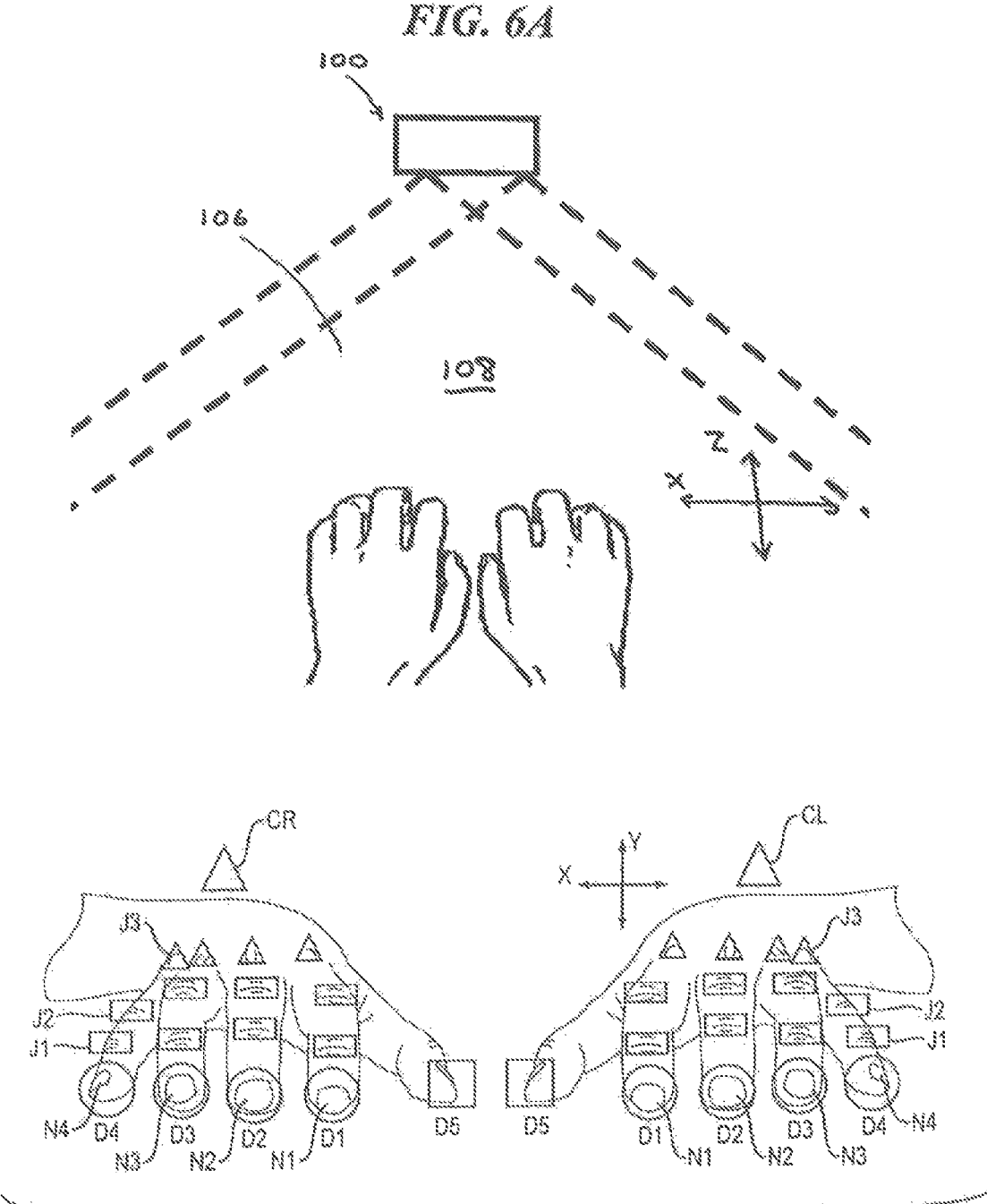
FIG. 6A is a top view of a gesture recognition input device and two human hands positioned in a keyboard input mode position within a workspace of the input device.
FIG. 6B schematically depicts an exemplary image captured by a sensor of a gesture recognition input device when a user is positioned as shown in FIG. 6A, with various anatomical landmarks identified in the image.

FIG. 6A shows a user's hands positioned in an exemplary "keyboard input mode position" in which the fingertips are resting on the surface 108 within the workspace 106 and the fingers are bent such that the user's palms are facing down towards the surface 108. In other words, the user places their hands in a ready position as they might do when typing on a traditional, physical keyboard. FIG. 6B illustrates an exemplary image captured by one of the sensors 102, 104 when a user assumes the keyboard input mode position. As shown, the fingernails N1 through N4 and joints J1 through J3 of D1 through D4 on both hands are typically visible in the keyboard input mode position. FIG. 6B also shows the core positions CL, CR of each hand, which is calculated as described above. When the mode selection module 308 detects the user's hands are positioned in the keyboard input mode position, the current operating mode is switched to the keyboard input mode.

Figures 7A, 7B:
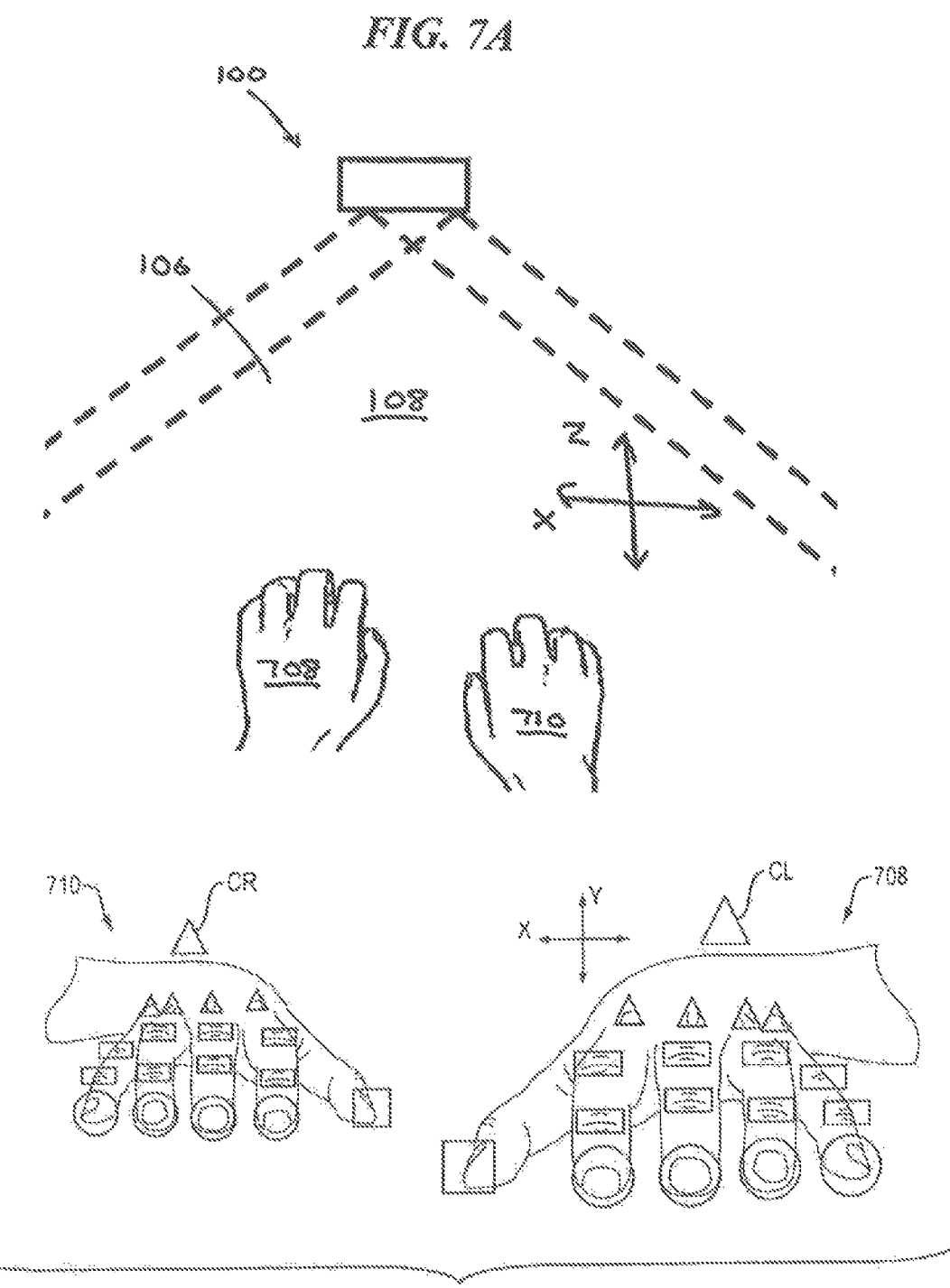
FIG. 7A is a top view of a gesture recognition input device and two human hands positioned in a number pad input mode position within a workspace of the input device.
FIG. 7B schematically depicts an exemplary image captured by a sensor of a gesture recognition input device when a user is positioned as shown in FIG. 7A, with various anatomical landmarks identified in the image.

FIG. 7A shows a user's hands positioned in an exemplary "number pad input mode position." This position is similar to the keyboard input mode position, except that the user's dominant hand 708, or the hand which the user wishes to use for number pad input, is moved forwards and/or at least slightly outward away from "home" keyboard gesture position. FIG. 7B illustrates an exemplary image captured by one of the sensors 102, 104 when a user assumes the number pad input mode position. As shown, the fingernails N1 through N4 and joints J1 through J3 of D1 through D4 on both hands are still visible in the number pad input position, but appear smaller for the non-dominant hand 710 than for the dominant hand 708, due to the placement of the dominant hand 710 closer to the sensors 102, 104. This size difference can be used to help distinguish between the keyboard input mode position and the number pad input mode position. In addition to the size difference, the change in hand position (e.g., as indicated by the core position CR, CL for each hand or the X, Y, and Z coordinates of one or more components of the user's hands) can be used to determine when mode changes occur. For example, the core change that occurs when a user picks up an entire hand and moves it to another position in the workspace 106 can be interpreted as an intention to transition to the number pad input mode. The calculated core positions CR, CL are also shown in FIG. 7B.

Another exemplary number pad input mode position is similar to the keyboard input mode position, except that the user's non-dominant hand 710, or the hand the user does not wish to use for number pad input, is removed from the workspace 106. Thus, the number pad input mode can be activated in several ways. If both hands 708, 710 are already in the workspace 106, the user can remove the non-dominant hand 710 and proceed with the dominant hand 708. Additionally, the user can keep both hands 708, 710 in the workspace and just move the dominant hand 708 forward. Also, if neither hand is present in the workspace 106, the user can enter the number pad input mode by entering the workspace with only one hand. To return to the keyboard input mode, the user can drop the dominant hand 708 back into the original depth of the keyboard input mode position and return to typing. Alternatively, the user can reenter the workspace 106 with the non-dominant hand 710 to resume keyboard input mode. When the mode selection module 308 detects the user's hands are positioned in the number pad input mode position, the current operating mode is switched to the number pad input mode.

Figures 8A, 8B:
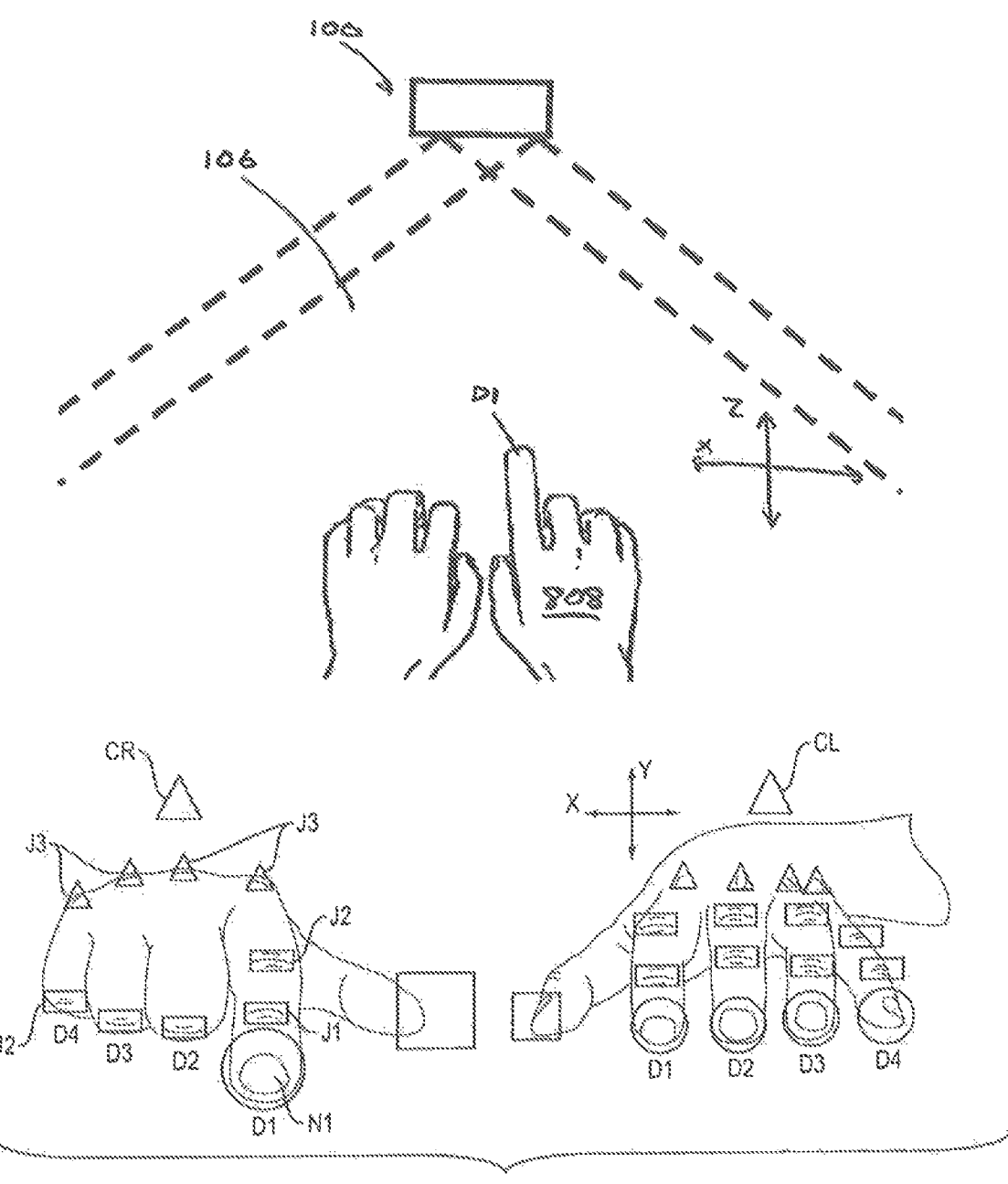
FIG. 8A is a top view of a gesture recognition input device and two human hands positioned in a mouse input mode position within a workspace of the input device.
FIG. 8B schematically depicts an exemplary image captured by a sensor of a gesture recognition input device when a user is positioned as shown in FIG. 8A, with various anatomical landmarks identified in the image.

FIG. 8A shows a user's hands positioned in an exemplary "mouse input mode position." This position is similar to the keyboard input mode position, except that the index finger D1 of the user's dominant hand 808, or the hand which the user wishes to use for mouse input, is extended forwards in the Z direction, towards the device 100. FIG. 8B illustrates an exemplary image captured by one of the sensors 102, 104 when a user assumes the mouse input mode position. As shown, D1 on the dominant side is extended, while D2, D3, and D4 remain retracted. The D1 fingernail N1 is visible in this position, while the D2, D3, and D4 fingernails are not. Generally, a transition to this hand position will be exhibited by a gradual disappearance of the nails N2, N3, and N4 of D2, D3, and D4 respectively. In addition, all three joints J1, J2, and J3 of D1 are visible, whereas only two joints J2, J3 are visible on D2, D3, and D4. Further still, the joints J3 become more prominent when the fingers are retracted. In other words, instead of the joints J3 appearing to lie substantially flat in the left-right or X direction, valleys appear between the joints J3 when the fingers are retracted). This information can be used to distinguish the mouse input mode position from other hand positions. While in the mouse input mode position, click and drag functions can be accomplished using gestures similar to using a physical mouse, except that the user is not actually clicking a button. When the mode selection module 308 detects the user's hands are positioned in the mouse input mode position, the current operating mode is switched to the mouse input mode. Although the non-pointing hand is shown in FIGS. 8A-8B, the mouse input mode can also be entered and used by presenting only the pointing hand within the workspace 106.

As noted in the discussion above, the determination as to which operating mode is desired by the user can be made by assessing data output from the various sensors discussed above. For example, counting the number of finger nails present in the data captured by the sensors can be used to help determine whether one or more fingers are extended, as the nail is generally not visible to the sensors when a finger is retracted. Unique qualities of the fingernail can be used to identify fingernails within the sensor data. These qualities can include the shape of the nail, the reflectivity of the nail, and the position of the nail (the nail is assumed to be at the tip of the finger). The mode determination can be augmented by other data interpreted from the sensor output, such as changes in distance between joints of a digit that are observed when the digit is extended as opposed to when the digit is retracted.

It will be appreciated that a variety of user actions can be used as a trigger for transitioning between operating modes. For example, the mouse input mode can be entered when two hands are in the workspace and one hand retracts digits D2-D4 while extending D1. The mouse input mode can also be entered when one hand is present in the workspace with D1 extended, or when only one hand enters the workspace and D1 on the one hand is extended. Transitions to the mouse input mode can occur from the number pad input mode, the keyboard input mode, a custom pad input mode, and so on. By way of further example, the keyboard input mode can be entered when two hands enter the workspace, or when a hand enters the workspace while another hand is already present in the workspace. Transitions to the keyboard input mode can occur from the number pad input mode, the mouse input mode, the custom pad input mode, and so forth. By way of further example, the number pad input mode can be entered when a dominant hand moves forward while in the keyboard input mode, when only one hand enters the workspace, or when one hand exits the workspace leaving only one hand behind in the workspace. Transitions to the number pad input mode can occur from the mouse input mode, the keyboard input mode, the custom pad input mode, and so forth. It will be appreciated that the various input modes described above can function with a template present in the workspace, either in conjunction with the template or independently.

Gesture Library Module

The device can also include a gesture library module 310, which can allow the user to define custom gestures for use with various input modes discussed here (e.g., the keyboard input, number pad input, and/or mouse input modes). In other words, the gesture library module 310 can store rules that associate a particular input gesture with a particular output behavior. For example, an extended strike duration performed while in the keyboard input mode can be interpreted as a custom gesture that indicates a capital letter is desired. Similarly, a simultaneous strike of D1 and D2 (i.e., a two-finger tap), can be interpreted as a custom gesture that indicates a backspace or delete operation is desired. Two-finger taps of extended duration can be interpreted as a custom gesture that indicates a multiple character backspace or delete operation. So, for instance, to delete an entire section of text, the user can transition to the mouse input mode, highlight the text, and perform a two-finger tap. In one exemplary embodiment, a user's gesture of separating his index finger from thumb or bringing his index finger and thumb together in a pinching motion, within the workspace can be associated with a particular action such as zooming in or out, respectively.

Gestures defined by a user can be evaluated by the device 100 to determine how accurately they can be detected, and can be assigned a strength rating, as discussed below with respect to the strength rating module 328. Strength rating information can then be used to inform the user that a particular gesture is weak, or to suggest alternative gestures that might be stronger.

The gesture library module 310 can also include input modes that rely on the presence of a "template," as described below with respect to the template identification module.

Output Module

In various aspects, an output module 312 can define the universe of possible outputs that can be generated in response to user inputs, depending on the current operating mode. For example, the possible outputs for the keyboard input mode can include upper and lower case letters A-Z, return/enter, spacebar, capital letter, backspace, tab, function keys. The possible outputs for the number pad input mode can include numbers 0-9. The possible outputs for the mouse input mode can include point, click, double click, select, drag release, right click, and so forth. For example, in one embodiment, right click can be indicated by moving the index finger a distance to the right and perform a single tap. Additional possible outputs can include macros, symbols, punctuation marks, special characters, and other functions. For example, in a keyboard input mode, the user's non-dominant hand can perform a gesture for inputting a specialty key or function key such CTRL, ALT, Page Up, and Page Down.

Security Module

The device 100 can also include a security module 314 configured to authenticate a prospective user of the device 100 or a digital data processing system to which the device 100 is coupled. Utilizing stored user profile information, the user's unique hand dimensions can be used alone or in conjunction with other security measures (e.g., a predefined password or gesture) to determine whether the prospective user is an authorized user as a gating function (e.g., at the time of entry of a password upon initial entry into a workspace) and/or continually while the user accesses the system to ensure that the user remain authorized.

The security module 314 can also include a behavioral component based on the knowledge that when entering a password a user tends to mimic or repeat the same patterns, cadence, speed, typing style, and so forth. These behaviors can be stored as part of the user profile information for each authorized user, and can be compared to the behaviors of a prospective user to determine whether the prospective user is authorized. In an extreme example, this can advantageously differentiate between identical twins who have the same physical finger structure and characteristics. This protocol also has the ability to accommodate injury or some other unforeseen change in the physical nature of the user's hands which may affect behavior and/or appearance. The security module 314 can continually or intermittently monitor the user's typing style or other behaviors during operation to ensure that the current user is still an authorized user. For example, in some embodiments, the device 100 can determine that user authentication is required each time the number of landmarks present in the workspace falls below a predetermined threshold. In other words, when the user removes their hands from the workspace, the device 100 can become locked, requiring any user that subsequently enters the workspace to be authenticated, e.g., by comparing behavioral or physical attributes of the user to those of one or more predetermined authorized users. Thus, unlike a one-time password prompt, this can allow the device 100 to prevent access by unauthorized users when an authorized user unlocks the device 100 and then leaves the device 100 unattended. The security module 314 can keep track of and augment the behavior information to improve accuracy and adapt to behavioral changes over time.

Another security advantage provided by the device 100 is the ability to enter a password, social security number, credit card number, or any other sensitive data into a digital data processing system without the use of a visible keyboard. This can eliminate the risk of an unauthorized party looking over the shoulder of the user and watching which keys the user strikes to steal the sensitive information.

Template Identification Module

The device can also include a template identification module 316 to facilitate use of the device 100 with objects other than a user's hands, such as a "template," which can serve as "a workspace within a workspace." Templates can have a variety of configurations but in various embodiments can be a physical representation of a selected input mode with which the user can physically interact and/or manipulate. By way of example, the template can be a physical representation of a keyboard, mouse, number pad, special function key pad, music input (e.g., plano keyboard), drawing/writing implement, etc. In some embodiments, a template can be a plate or card having a surface with fixed key representations (e.g., alpha-numeric keys, keys associated with certain pre-defined functions, plano keys), fixed meaning the key representations have positions that are fixed relative to one another, but not necessarily fixed relative to the sensor(s) or the workspace. This can be used for example in specific industry environments where it is important for the specific commands associated with the template to be implemented in a more restrictive space (such as in a vehicle or a factory). The standardized key representations provided by the use of a template can also be helpful for different typing styles such as the two finger typist.

A template can be coded with a character, symbol, shape, image, pattern, etc. so as to be identifiable by the template identification module based on data generated by the sensors when the template enters the workspace. By way of example, the template identification module can be configured to recognize patterns used in industry (e.g., in the medical field) such as a bar codes and Quick Response (QR) codes so as to indicate a template of a particular function or dimension. With reference to FIG. 8C, for example, an exemplary keyboard template can have a sensor-facing edge of approximately $\frac{1}{16}^{th}$ inch that is coded with a pattern (e.g., an array of shapes, crosses) and that can be identified by the template identification module 316 as representing a keyboard having particular keys positioned at specific locations within the workspace. Alternatively, as shown in FIGS. 8D and 8E, for example, the template can define particular areas which can be associated with particular special functions such as pre-defined characters, macros, etc. or to which the user can assign specific functions (e.g., F2 button, Save, Macro 1). In various aspects, the template identification module 316 can determine the position of the template and/or its identity based on the detection of the pattern. By way of example, with reference to FIGS. 8D and 8E, a pattern of crosses on a sensor-facing edge of the template will be altered based on the orientation of the template relative to the device 100. For example, if the template is askew to the device 100 (FIG. 8D), the observed pattern would appear narrowing and shrinking relative to that same pattern on a template that is square to the device (FIG. 8E). The device can then utilize this detected pattern to determine the coordinates that represent the one or more areas on the template that are defined to represent a particular input. Once the template is identified and its position within the workspace determined based on its code, for example, the device 100 can equate user gestures with the specific functions or inputs defined on the template. In some embodiments, the device 100 can be configured to respond only to hands or templates, such that movement of other objects (e.g., writing instruments) within the workspace or a changing background can be ignored.

The template identification module 316 can also be configured to detect various objects that can be manipulated by the user in the workspace 106 and detected by the sensors. For example, the template identification module may be configured to identify an exemplary tool such as a stylus (e.g., pen, pencil) or other instrument that is held by a user based on its size, shape, color, or other identifying characteristics. Further, in some aspects, tools can include a code (e.g., bar code, QR code) and/or pattern that enables the template identification module to identify the tool and/or determine its position in the workspace. Moreover, as discussed otherwise herein, the processor can track the code and/or pattern within the workspace so as to provide positional and movement data from which additional input information can be determined. By way of example, the orientation (e.g., tilt) and speed of a stylus through detection of the pattern can be used to calculate the weight, thickness, or intensity of a line that is indicated by the user with the stylus.

Figure 8F:
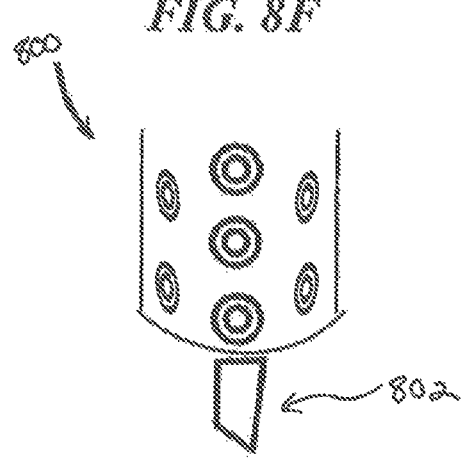
FIG. 8F depicts an exemplary object for use in the workspace and having an exemplary pattern that can be identified and/or tracked by the processor.
Figure 8G:
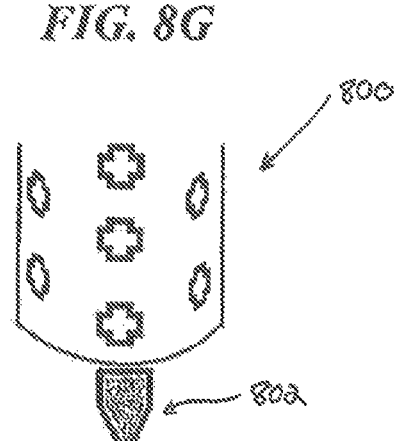
FIG. 8G depicts another exemplary pattern disposed on the object of FIG. 8C.

With reference to FIGS. 8F and 8G, for example, the template identification module 316 can determine the presence of a tool (e.g., a drawing tool) and/or characteristics of the desired input represented by the tool (e.g., color, line weight, pattern produced by the representative drawing tool) based on the identification of a pattern disposed on the tool (e.g., stylus 800). For example, the pattern of concentric circles disposed on the exemplary stylus 800 in FIG. 8F could be identified by the template identification module 316 as representing a highlighter, for example, whereas the pattern of crosses depicted in FIG. 8G could identify a pen that generates a line of a specified color and/or line thickness. In some aspects, for example, a stylus representing a pen could be tilted so as to increase the thickness of a line indicated by the motion of the stylus. Moreover, as discussed otherwise herein, the processor can track the movement of the pattern as the user manipulates the stylus 800 within the workspace so as to allow the position and orientation of the drawing tool to be tracked and the user input determined. This can allow the device 100 to be positioned such that the workspace 106 includes the surface of a white board, desktop, tabletop, display, wall, etc. and such that the device 100 can detect movement of the tool and interpret such movement as various user inputs. For example, in some embodiments, a plurality of writing instruments can be provided, each having a unique characteristic, marking, and/or pattern that associates the writing instrument with a particular type of input information or input attribute (e.g., an input color, an input line weight, and so forth). Further, though the styluses 800 are depicted in FIGS. 8F and 8G as having a physical tip 802 (e.g., a dry-erase tip) that allow the user to actually write on an object (e.g., paper or white board) while the movement of the stylus is also detected by the device 100, it will be appreciated that the tip may merely visually represent to the user the input characteristics of the tool (e.g., color, line weight, etc.). Additionally, in some embodiments, the tool can include a mechanism that enables the user to select for a desired input. By way of example, a user could depress a mechanical button on the stylus 800 such that the pattern displayed by the stylus 800 as depicted in FIG. 8F is replaced by the pattern depicted in FIG. 8G. In some embodiments, for example, the template can additionally include one or more controls that allow the user to directly communicate commands to the processor. For example, in various embodiments, the user could depress a button that could transmit input information to the processor (e.g., via radio or an IR signal) to undo a previous gesture. In such a manner, the template identification module 316 could therefore indicate the desired input characteristics to be associated with detection of the stylus' motion.

Error Handling Module

The device 100 can also include an error handling module 318 for improving overall accuracy of the device 100. For example, the error handling module 318 can include a word guesser that is configured to resolve a close call as to which of a plurality potential "keys" has been struck by comparing one or more previous inputs to a dictionary or other reference data source.

Clock Module

The device 100 can also include a clock module 320 for assessing speed of user gestures (which can be used to help determine the specific input the user is attempting to provide), or for determining when it is appropriate to place the device 100 in a hibernation mode to conserve battery life. For example, if a predetermined time elapses without user input, the device can automatically enter a hibernation mode in which the sample rate of the sensors 102, 104 is reduced and the light source 112 is turned off.

Feedback Module

Alternatively or in addition to an output generated by a digital data processing system resulting from detection by the device 100 of the user's gestures within the workspace, the device 100 can also include a feedback module 322 configured to provide visible or audible feedback to the user. In one embodiment, the feedback module 322 can be configured to display a popup keyboard or other graphical template on a display device. When a strike or other user gesture is detected, the key that was struck can be highlighted on the popup representation. Display of the popup can be triggered by a user positioning their hands at the ready position with no movement for a predetermined time period. The duration of the time period can be adjusted, and the popup can be disabled altogether. This feature can be helpful when a user is first getting accustomed to operating the device 100, and needs a visual guide to locate "keys." The reference screen or template can also be displayed in response to a predetermined gesture, which can be stored by the gesture library module 310. The reference screen can also be mode-specific, such that a keyboard is displayed in the keyboard input mode, a number pad is displayed in the number pad input mode, etc. Other types of feedback can also be provided by the feedback module 322, for example by generating a click or other sound when a strike is detected.

Motion Calculation Module

Figure 8H:
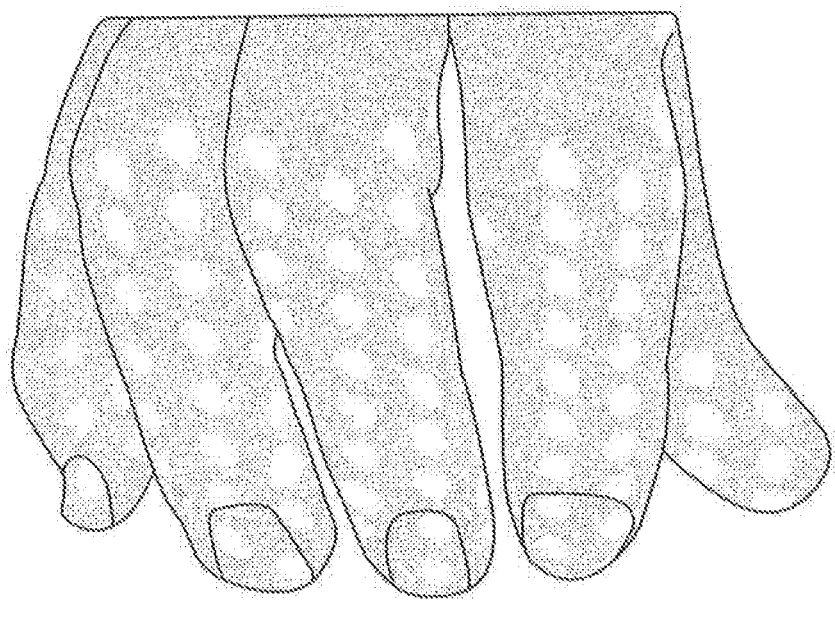
FIG. 8H depicts an exemplary representation of the projection of structured light onto a user's hand in a first position.
Figure 8I:
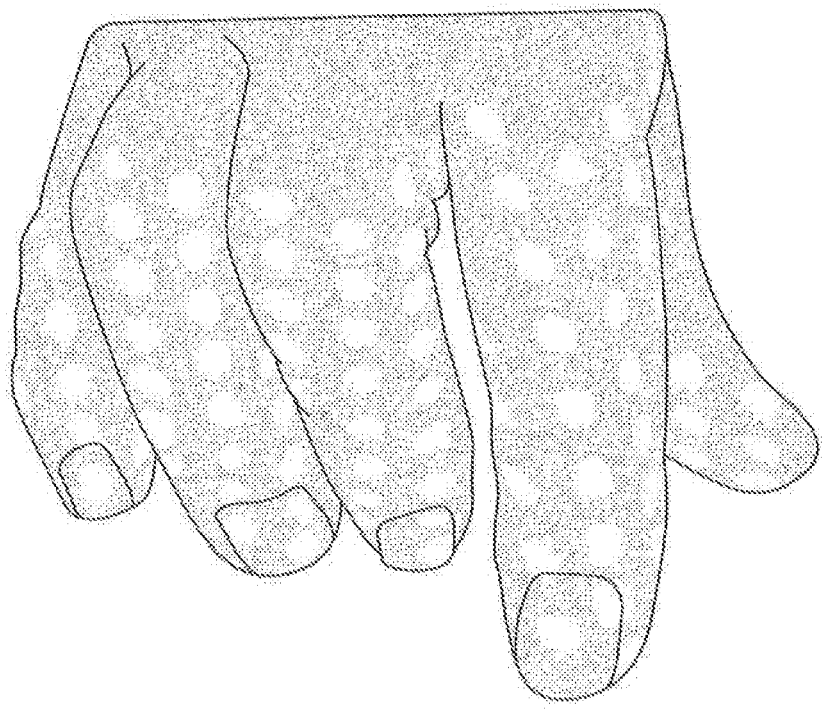
FIG. 8I depicts an exemplary representation of the projection of structured light on a user's hand in a second position.

The device 100 can also include a motion calculation module 324 for assessing motion of a user within the workspace 106. As noted above, data generated by the sensors over time can be processed to derive vertical distance, vertical velocity, vertical acceleration, horizontal distance, horizontal velocity, horizontal acceleration, angular displacement, angular velocity, angular acceleration, changes in size, etc. for one or more components of the user's hands. For example, with reference to FIGS. 8H and 8I, a user's hand having an exemplary representation of structured light (e.g., visible, IR) projected thereon is depicted as moving from a first position (FIG. 8H) to a second position (FIG. 8I). The data generated by a structured light sensor regarding the pattern, size, and shape of each circle of the structured light as the user's hand is moved can be used by the processor (e.g., the motion calculation module) to determine the instantaneous three-dimensional positioning of the user's hand as well as its movement over time based on changes in the location, size, and shape of the circles. It will be appreciated that though the structured light in the depicted embodiment demonstrates a plurality of circles, a variety of patterns of structured light could be used (e.g., horizontal lines, vertical lines, colored light bars, etc.). It will be appreciated that the structured light can be of the nature of infrared and thus invisible to the human eye.

Further, though the exemplary motion calculation module 324 can derive three-dimensional positioning and/or motion of an object in the workspace based on data derived from a single three-dimensional sensing modality (e.g., a structured light sensor) as described above, for example, it will be appreciated that the processor can additionally receive data generated by one or more additional sensor(s) of the same or different modality in order to generate an even more robust representation of the user's interaction of the workspace. In some embodiments, for example, as part of the motion calculation, a stream of values for a set of "active movement variables" can be adjusted based on a core calculation performed by the orientation calculation module 304 based on data received from another structured light sensor or an imaging sensor so as to fine-tune the processing by the various modules. By way of example, the movement variables can be compared across the various sensors. In one embodiment, the current operating mode determined by the mode selection module 308 can be used to determine which of the active movement variables are pertinent to the movement calculation.

Three dimensional variables can also be calculated by comparing the output of the multiple sensors, each of which has a different vantage point of the workspace 106. By using two or more imaging sensors 102, 104, for example, triangulation or parallax algorithms can be used to obtain a depth calculation to determine how close or far a particular segment of the user's hands is with respect to the sensors 102, 104. Exemplary techniques for determining the depth of a particular object based on stereo images are disclosed in Su at al., "TOWARDS AN EMG-CONTROLLED PROSTHETIC HAND USING A 3-D ELECTROMAGNETIC POSITIONING SYSTEM," IEEE Transactions on Instrumentation and Measurement, Vol. 56, No. 1, February 2007; Jain et al., "MACHINE VISION," Chapter 11, Pages 289-308, 1995; Hartley et al., "MULTIPLE VIEW GEOMETRY IN COMPUTER VISION, FIRST EDITION," Chapter 8, Pages 219-243, 2000; Sibley et al., "STEREO OBSERVATION MODELS," University of Southern California, Jun. 16, 2003; and Prince et al., "PATTERN RECOGNITION AND MACHINE VISION: STEREO VISION AND DEPTH RECONSTRUCTION," University College London—Computer Science Department, 2006, the entire contents of each of which are incorporated herein by reference. Similarly, in some exemplary embodiments in which data is obtained from the different vantage points by a plurality of spatially-separated three-dimensional sensors (e.g., two structured light sensors with one or more light sources) or from a three-dimensional sensor and a spatially-separated imaging sensor, for example, the processor can generate a more robust representation of the user's interaction with the workspace. By way of example, an imaging sensor (e.g., camera) can indicate additional data such as position, movement, color, shape, etc. that is useful in one or more modules described herein. In some aspects, for example, the data generated by the various sensors can still provide information regarding portions of the workspace that are occluded from detection by one of the sensors.

Classification Module

In various aspects, systems and methods in accord with the present teachings can include a classification module configured to associate data generated by the sensors based on the user's gestures in the workspace with user input information. By way of example, once a motion calculation module determines a change in position, speed, acceleration, or angle between anatomical landmarks (e.g., segments, knuckles, fingernails) over time, the classification module can associate such measurements with a particular user input. By way of example, the classification module can determine based on the observed changes in position, orientation, and/or speed of portions of the user's hand that the user's action should be classified as the strike of a particular key, for example, when operating in a keyboard input mode. Such a determination could be made, for example, by comparing the observed motion with that of a library of reference motions.

In various aspects, for example, the device 100 can include a classification module 326 that interprets the stream of active motion variables generated by the motion calculation module 324 as a particular user gesture or action. In other words, the classification module 326 can determine which finger is about to strike, where the strike occurs, and whether the strike is indeed a strike.

To determine which finger is about to strike, the classification module 326 can track as many fingers as necessary, which preferably is at least four on each hand. The classification module 326 can assess any of a variety of attributes of the user's anatomical landmarks, such as changes in vertical distance between a landmark and the surface 108 on which the device is rested, the velocity signature of the landmark, the acceleration of the landmark, or the distance, velocity, or acceleration of the landmark relative to one or more other landmarks. Thus, the classification module 326 can assess how each finger or finger segment is moving in relation to other fingers or finger segments. This can help improve accuracy when the user is a "concert mover" (i.e., when the user's typing style is to move multiple fingers when making a single keystroke) or when the user is a fast typist (i.e., when the user's typing style is to begin moving a finger for a subsequent keystroke before another finger finishes executing a previous keystroke). In some embodiments, the classification module 326 can determine the "fast mover" (e.g., the digit which is accelerating the fastest, has the most dramatic change in velocity, or has the most deliberate directional change angles). The fast mover can be isolated as the currently-striking finger in such embodiments. The classification module 326 can also assign different weights to user movements that are potential strike candidates depending on the zone in which the movement occurs or in which the movement is initiated. For example, a movement that is a potential strike candidate can be assigned a low weight when the movement is initiated or executed in the zone of interest, whereas a similar movement initiated or executed in the active zone can be assigned a higher weight. The assigned weighting can be used to decide whether or not a strike candidate is ultimately classified as a strike.

To determine where a strike occurs, the classification module 326 can interpret the X, Y, and Z positional data produced by the motion calculation module 324 in conjunction with the orientation information generated by the orientation calculation module 304. Other motion properties such as vertical velocity, vertical acceleration, horizontal velocity, horizontal acceleration, angular displacement, angular velocity, angular acceleration, and so forth can also be considered.

To determine whether a strike has occurred, the classification module 326 can interpret a broad range of data. For example, the classification module 326 can consider the speed with which the user generally types or other behavioral data by referencing user profile information stored by the user profile module 302. The classification module 326 can also examine the motion variables for certain indicators such as a decreasing vertical distance (e.g., indicating that a fingertip is approaching the surface within the workspace), vertical velocity signature, linear velocity signature, acceleration signature, angular velocity signature, and angular displacement signature. Using this information, the classification module 326 can distinguish between an intended key strike (e.g., a movement typically characterized by a high acceleration followed by a sudden drop in acceleration) and a situation in which the user is merely resting their fingers on the surface 108 (e.g., a movement typically characterized by low accelerations without sudden changes). The classification module 326 can also determine whether a strike has occurred by determining whether the user movement occurs in the active zone, the zone of interest, or some other area within the workspace 106.

The classification module 326 can also consider a digit's previous status, which can help reduce errors. For example, the classification module 326 can distinguish between a digit that moves from a "floating" position to a "ready" position and a digit that moves from a "floating" position to a "strike" position.

Figure 9A:
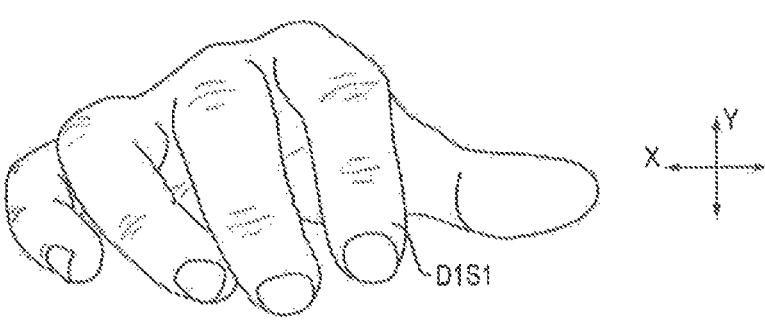
FIG. 9A schematically depicts an exemplary image captured by a sensor of a gesture recognition input device of a user's right hand performing a strike gesture.
Figure 9B:
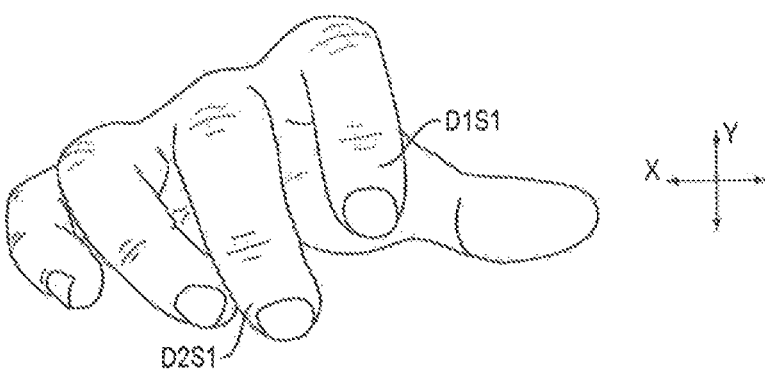
FIG. 9B schematically depicts an exemplary image captured by a sensor of a gesture recognition input device of a user's right hand performing a strike gesture.
Figure 9C:
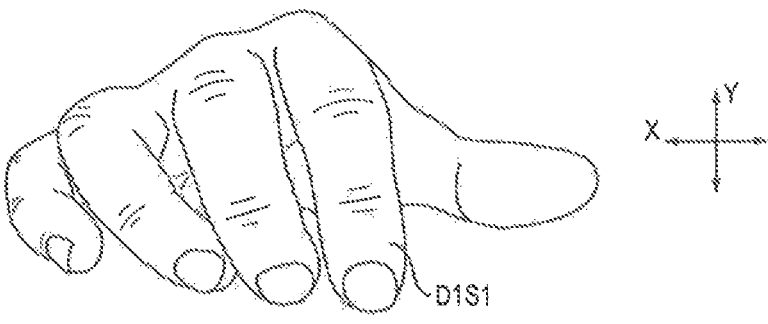
FIG. 9C schematically depicts an exemplary image captured by a sensor of a gesture recognition input device of a user's right hand performing a strike gesture.

FIGS. 9A-9C illustrate data generated by one of the sensors 102, 104 when a user performs a key strike with the intention of inputting the character "M" into a digital data processing system to which the device 100 is coupled. As shown in FIG. 9A, the user's right D1S1 lifts in the Y direction from a home position (e.g., a "J" position), out of the active zone, and into the inactive zone. As shown in FIG. 9B, the user's right D1S1 then moves in the Z direction away from the sensors and in the X direction towards D2S1, arriving above an "M" position. As shown in FIG. 9C, the user's right D1S1 then descends in the Y direction in a strike motion from the inactive zone to the active zone, completing the key strike.

Exemplary motion variables that can be monitored/calculated by the device 100 while a user is typing are graphed in FIGS. 10A-10K. In each graph, exemplary values are shown for a time period in which the user types the character sequence "J U J Y J H J N J M J J" using the device 100. In other words, each graph represents the same typing event. The graphs illustrate the two-dimensional data generated from a single sensor. As will be appreciated from the graphs, there can be a slight time discrepancy between noteworthy events in this two-dimensional data and the actual user keystrokes. This discrepancy can be largely eliminated, however, by aggregating two-dimensional sensor data from a plurality of sensors to produce three-dimensional data, and augmenting said data with orientation data from a core calculation, as described herein.

Figure 10A:
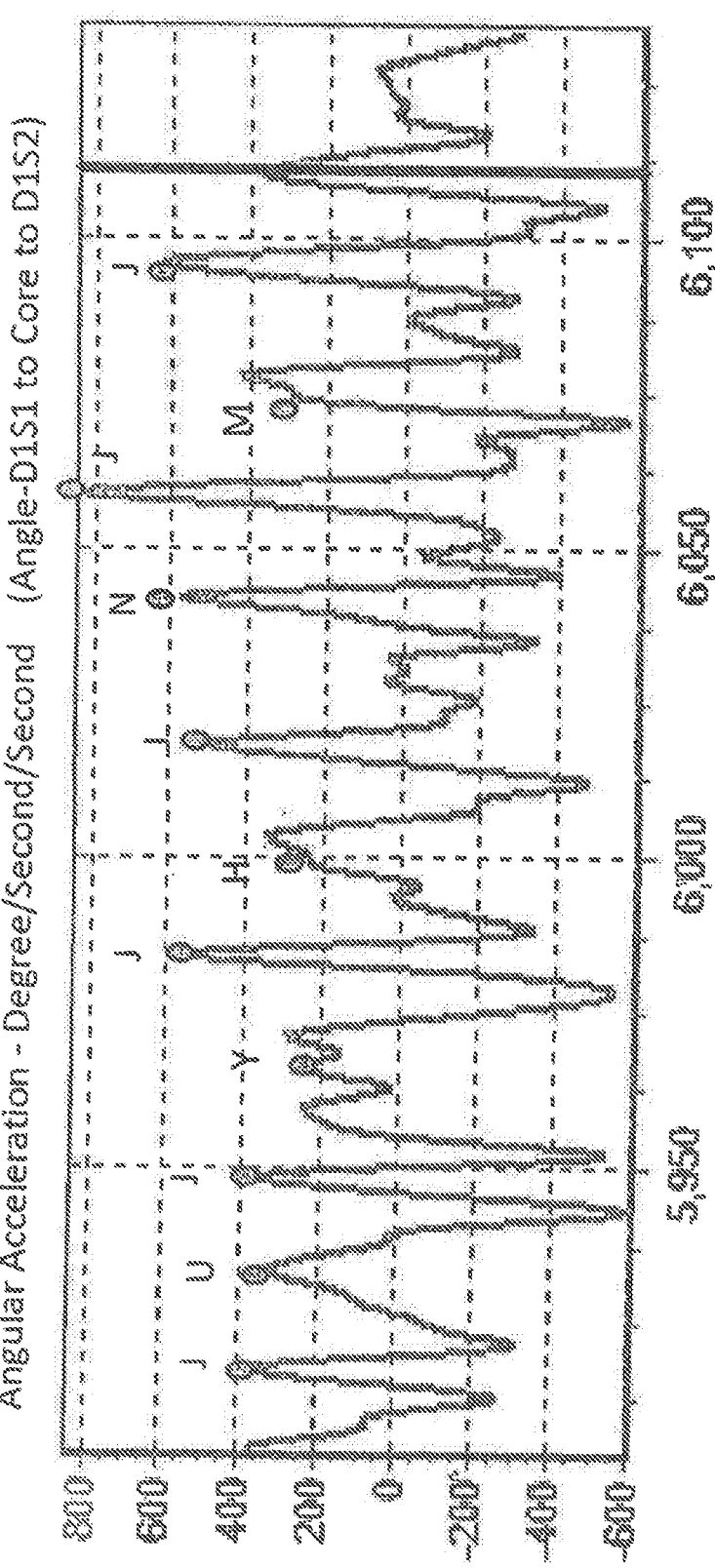
FIG. 10A is a graph of angular acceleration as a function of time for an exemplary sequence of key strikes.

In FIG. 10A, angular acceleration is shown for an angle having the core CR of the user's right hand as its vertex, a first ray extending from the core to D1S1, and a second ray extending from the core to D1S2. The angular acceleration, expressed in terms of degrees per second per second, is plotted as a function of time, which is expressed in terms of image frame number. Each key stroke is labeled in the graph with a circle. As shown, a sharp positive spike in angular acceleration occurs at the timing with which each "key" is struck.

Figure 10B:
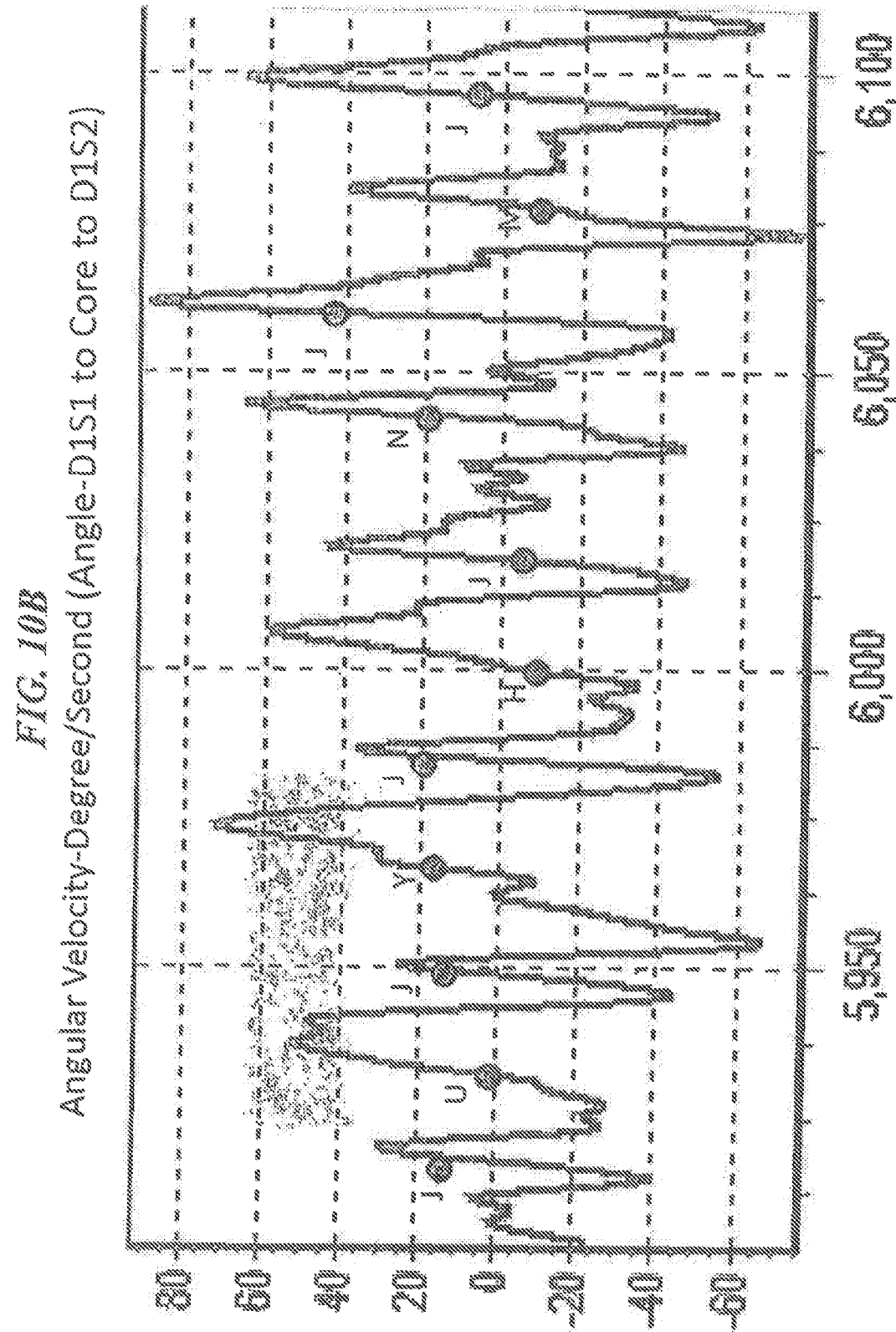
FIG. 10B is a graph of angular velocity as a function of time for the sequence of key strikes of FIG. 10A.

In FIG. 10B, angular velocity is shown for the angle whose acceleration is shown in FIG. 10A. The angular velocity, expressed in terms of degrees per second, is plotted as a function of time, which is expressed in terms of image frame number. Each key stroke is labeled in the graph with a circle. As shown, the timing at which each "key" is struck corresponds roughly to a midpoint or inflection point between adjacent negative and positive velocity spikes. The positive spikes in angular velocity do not occur until after the timing at which each "key" is struck.

Figure 10C:
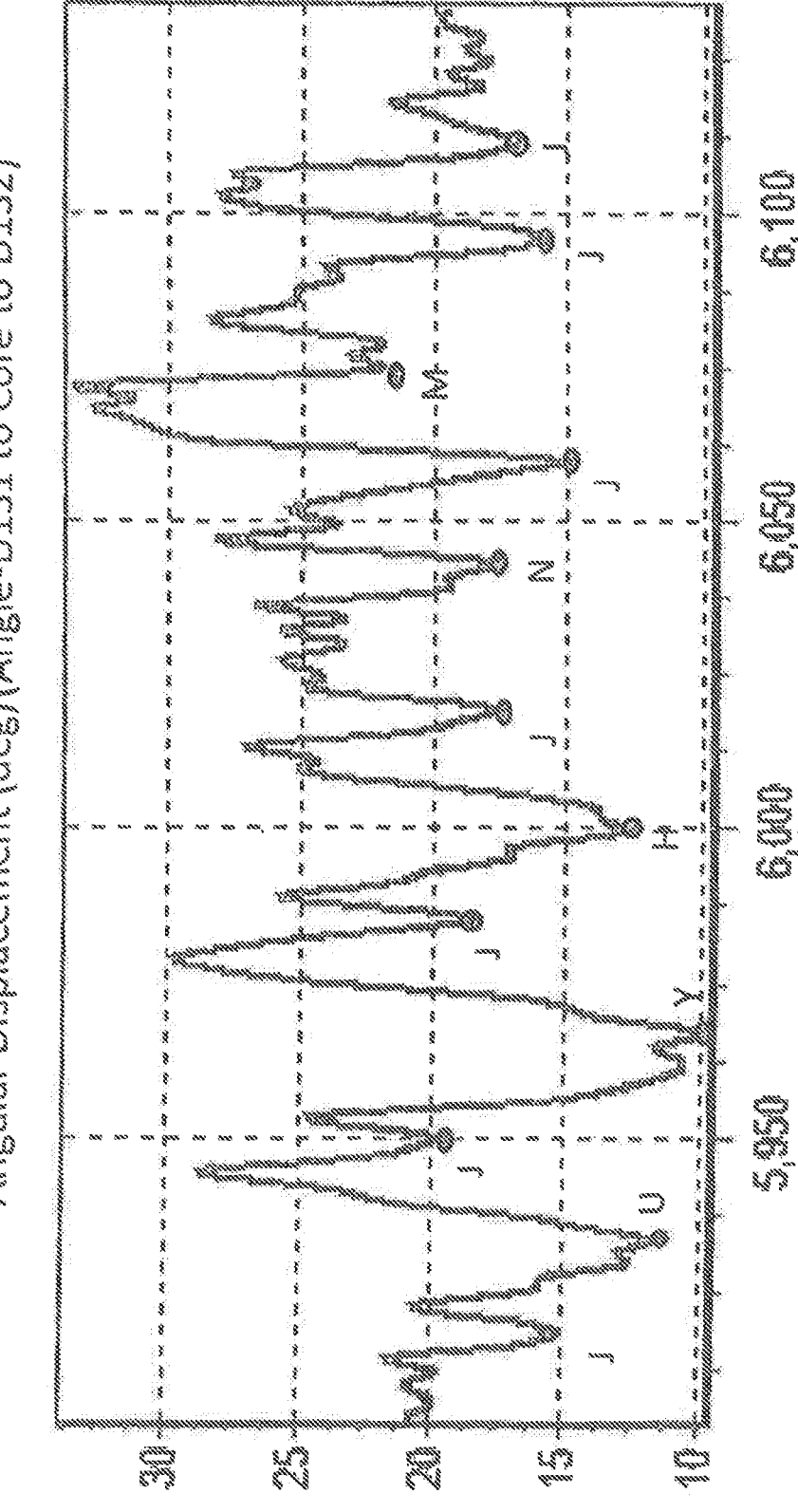
FIG. 10C is a graph of angular displacement as a function of time for the sequence of key strikes of FIG. 10A.

In FIG. 10C, angular displacement is shown for the angle whose acceleration and velocity are shown in FIGS. 10A-10B. The angular displacement, expressed in terms of degrees, is plotted as a function of time, which is expressed in terms of image frame number. Each key stroke is labeled in the graph with a circle. As shown, a sharp falling spike in angular displacement occurs at the timing with which each "key" is struck. In other words, angular displacement suddenly reverses course when a key is struck.

Figure 10D:
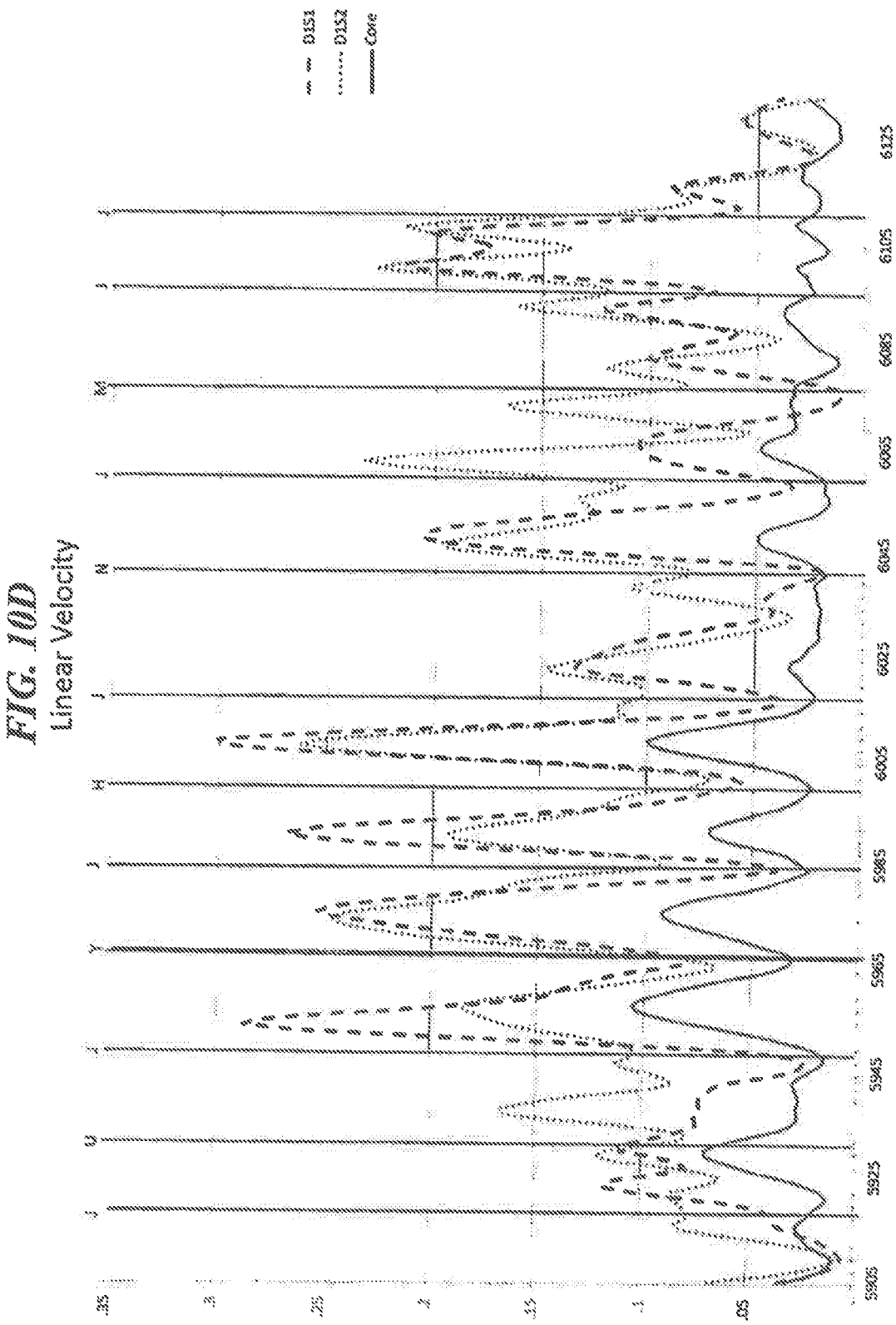
FIG. 10D is a graph of linear velocity as a function of time for the sequence of key strikes of FIG. 10A.

In FIG. 10D, linear velocity is shown for each of the core of the user's right hand, the user's right D1S1, and the user's right D1S2. The linear velocity of each of these components, expressed in terms of feet per second, is plotted as a function of time, which is expressed in terms of image frame number. Each key stroke is labeled in the graph with a vertical line. As shown, each key stroke is accompanied by a negative peak in linear velocity. The graph also highlights the value in comparing movement of a particular anatomical landmark to movement of one or more other anatomical landmarks. For example, the velocity of D1S1 is generally much higher than the velocity of D1S2 during the J to Y sequence, whereas the opposite is generally true during the J to M sequence. This is because for a "back" motion (e.g., one in which the user moves their finger in the Z direction away from the sensors from a J position to an M position), D1S2 typically pops up in the Y direction faster and higher than D1S1. On the other hand, for a "forward" motion (e.g., one in which the user moves their finger in the Z direction towards the sensors from a J position to a Y position), D1S2 typically drops much more than D1S1 but D1S1 has a greater velocity.

Figure 10E:
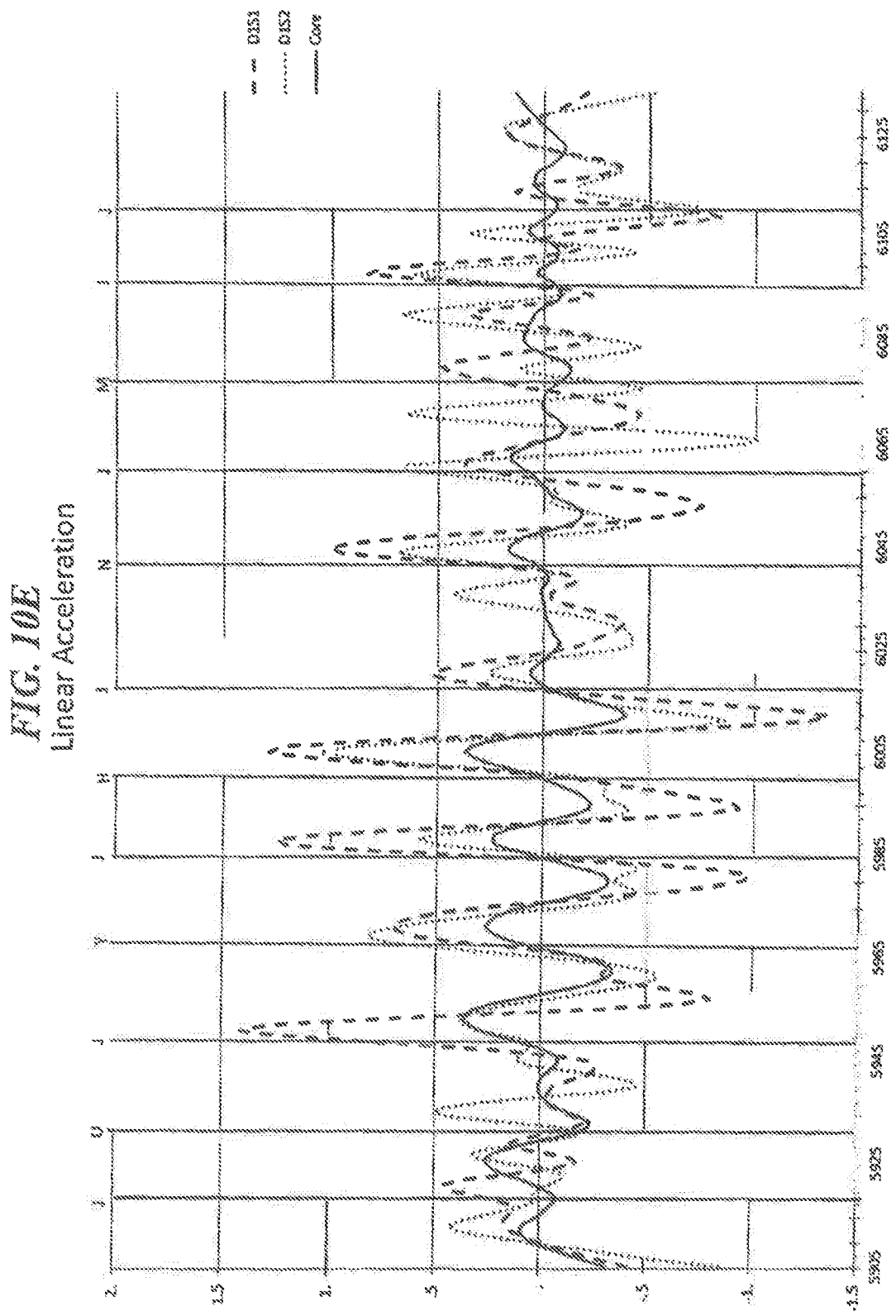
FIG. 10E is a graph of linear acceleration as a function of time for the sequence of key strikes of FIG. 10A.

In FIG. 10E, linear acceleration is shown for each of the core of the user's right hand, the user's right D1S1, and the user's right D1S2. The linear acceleration of each of these components, expressed in terms of feet per second per second, is plotted as a function of time, which is expressed in terms of image frame number. Each key stroke is labeled in the graph with a vertical line. As shown, the timing at which each "key" is struck corresponds roughly to a midpoint or inflection point between adjacent negative and positive acceleration spikes. The positive spikes in linear acceleration do not occur until after the timing at which each "key" is struck.

Figure 10F:
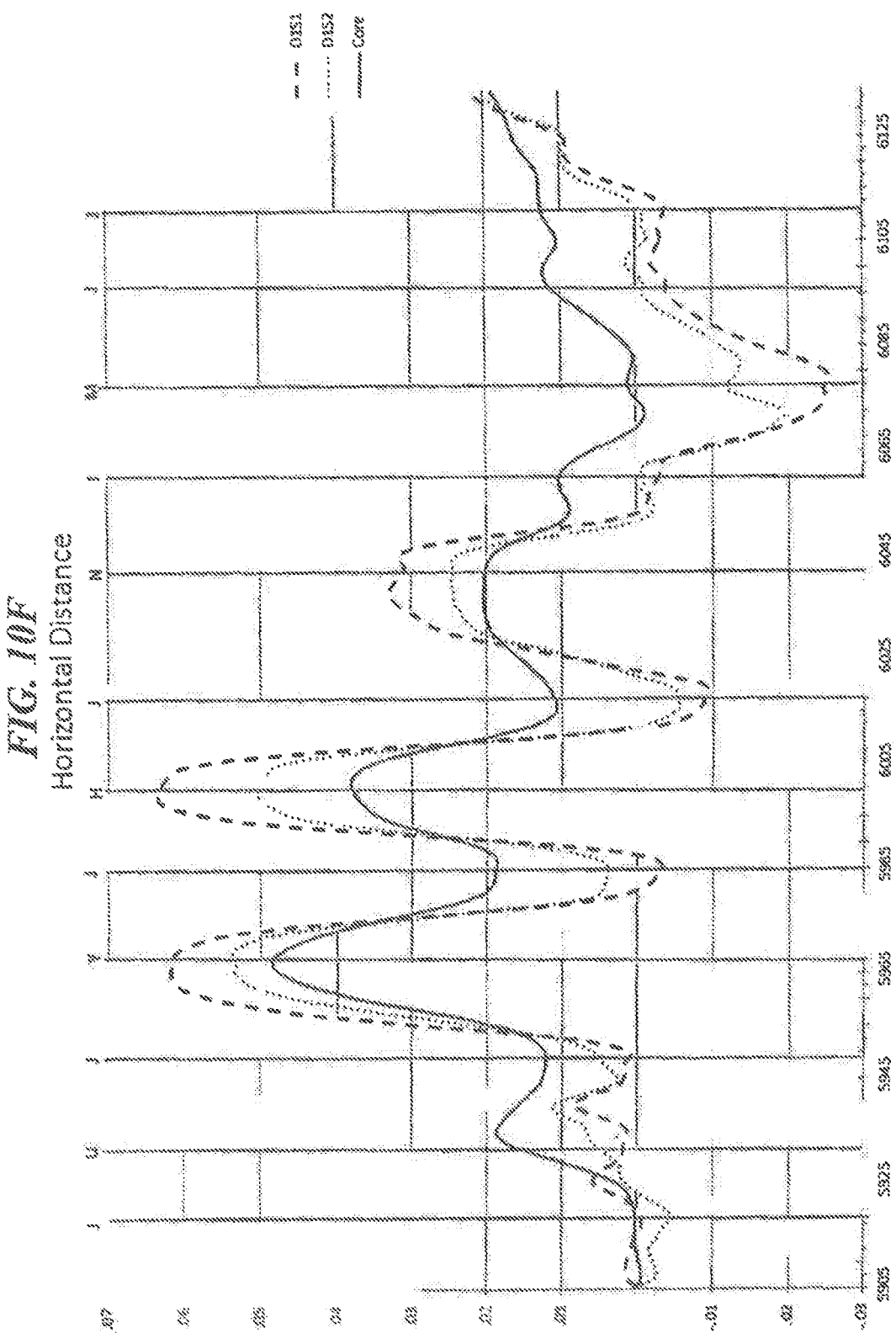
FIG. 10F is a graph of horizontal distance as a function of time for the sequence of key strikes of FIG. 10A.

In FIG. 10F, horizontal distance is shown for each of the core of the user's right hand, the user's right D1S1, and the user's right D1S2. The horizontal distance of each of these components, expressed in terms of feet, is plotted as a function of time, which is expressed in terms of image frame number. Each key stroke is labeled in the graph with a vertical line. As shown, the horizontal distance variable can be additive to the other measurements as one can observe the distance traveled during a J to Y sequence or during a J to H sequence is much greater than, and distinct from, the back motion of a J to N sequence or a J to M sequence. The relationship between these two exemplary landmarks (D1S1 and D1S2) demonstrates the difference between a forward and reaching movement and a popping up and back movement. As also shown in the graph, a J to J sequence registers almost no change in horizontal distance as one would expect when the user is striking the same position.

Figure 10G:
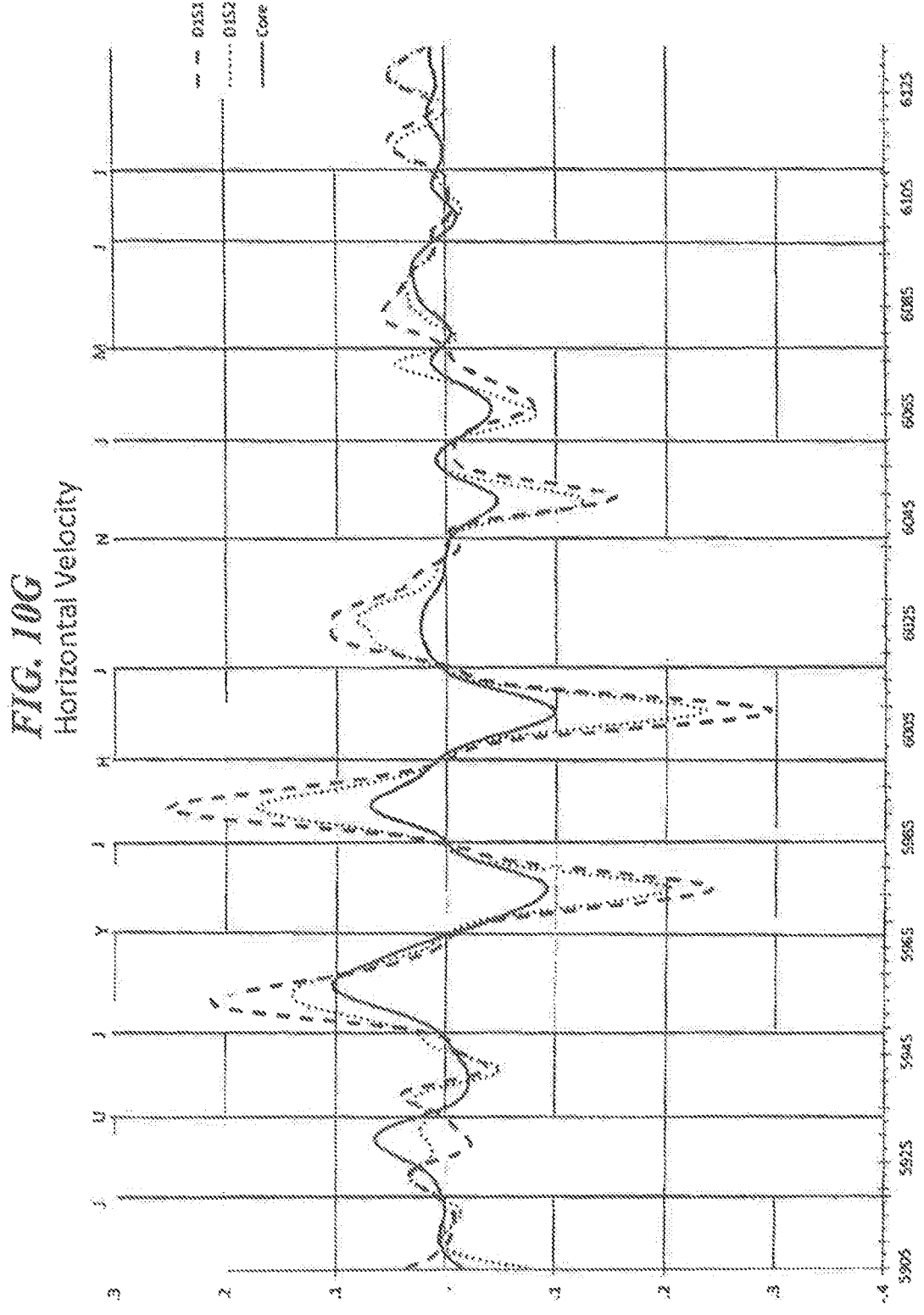
FIG. 10G is a graph of horizontal velocity as a function of time for the sequence of key strikes of FIG. 10A.

In FIG. 10G, horizontal velocity is shown for each of the core of the user's right hand, the user's right D1S1, and the user's right D1S2. The horizontal velocity of each of these components, expressed in terms of feet per second, is plotted as a function of time, which is expressed in terms of image frame number. Each key stroke is labeled in the graph with a vertical line. As shown, the horizontal velocity tends to be approximately zero at the moment of each "key" strike.

Figure 10H:
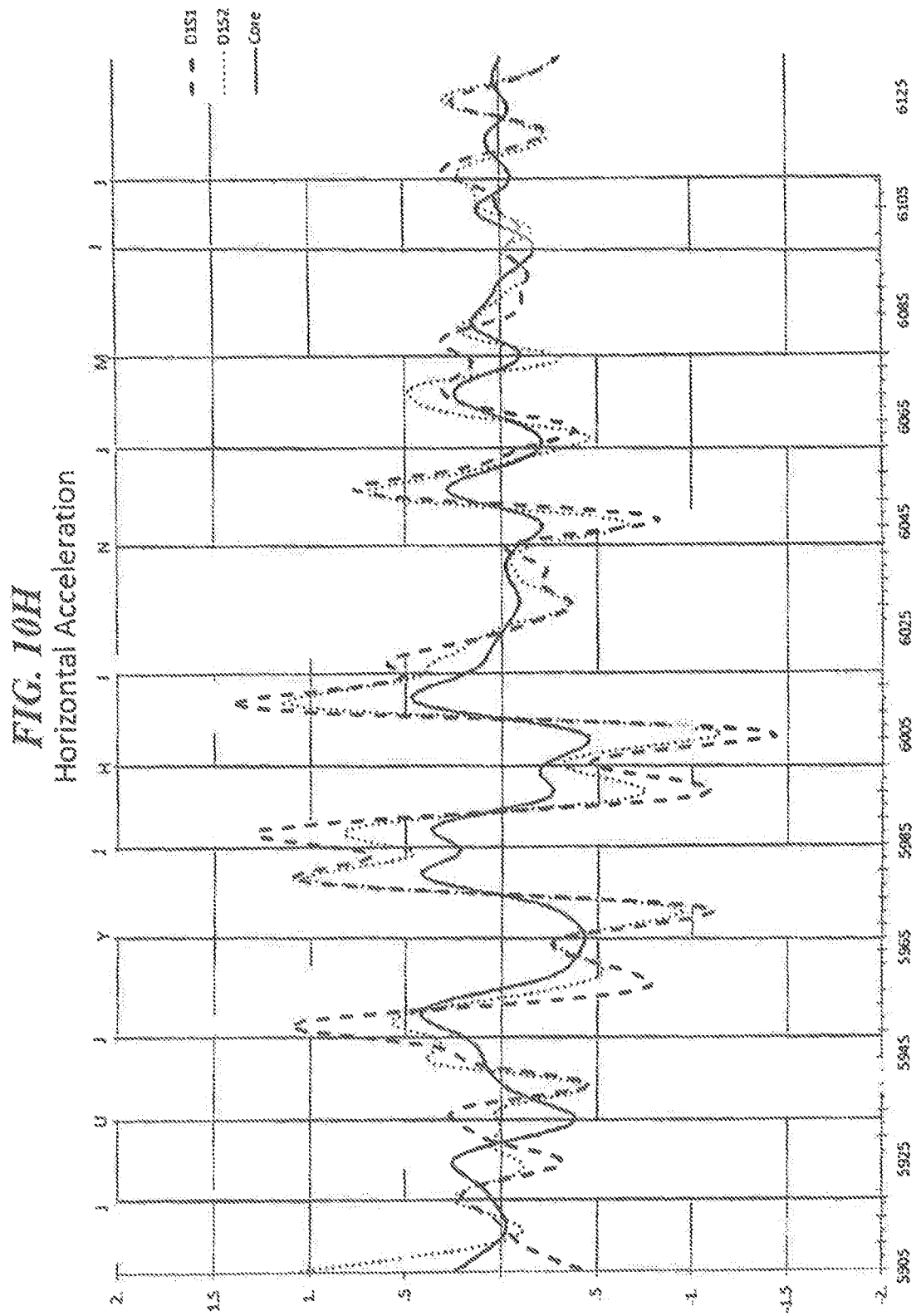
FIG. 10H is a graph of horizontal acceleration as a function of time for the sequence of key strikes of FIG. 10A.
Figure 10I:
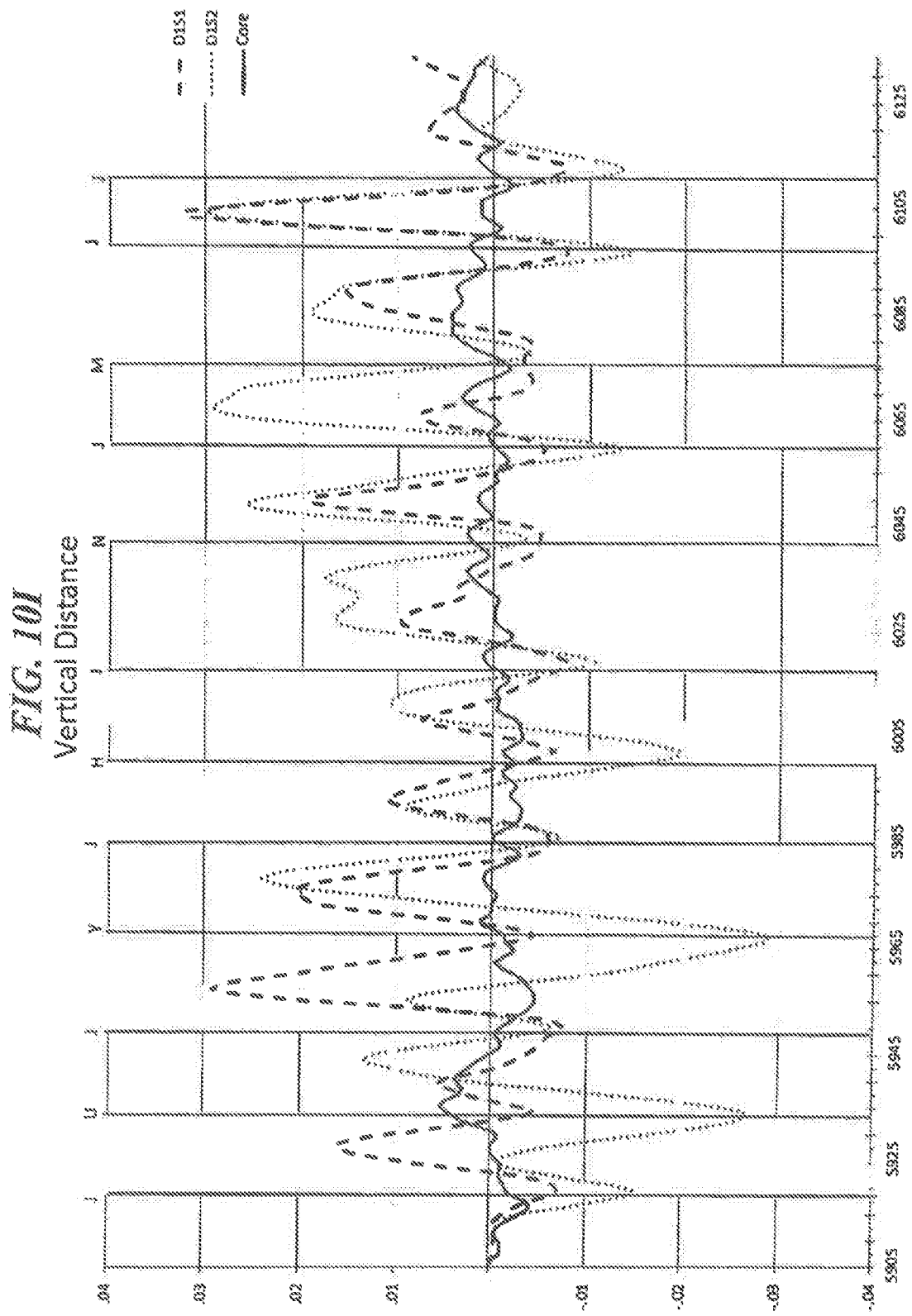
FIG. 10I is a graph of vertical distance as a function of time for the sequence of key strikes of FIG. 10A.

In FIG. 10H, horizontal acceleration is shown for each of the core of the user's right hand, the user's right D1S1, and the user's right D1S2. The horizontal acceleration of each of these components, expressed in terms of feet per second per second, is plotted as a function of time, which is expressed in terms of image frame number. Each key stroke is labeled in the graph with a vertical line. The horizontal acceleration variable can be particularly useful to help interpret user intent. For example, the disparity in horizontal acceleration between D1S1 and D1S2 can be of particular interest. During a J to Y sequence, for example, the graph shows a signature that confirms reaching forward and up. This is in contrast to the J to M sequence, for example, in which the signature is indicative of an up and back motion. In FIG. 10I, vertical distance is shown for each of the core of the user's right hand, the user's right D1S1, and the user's right D1S2. The vertical distance of each of these components, expressed in terms of feet, is plotted as a function of time, which is expressed in terms of image frame number. Each key stroke is labeled in the graph with a vertical line. As shown, the vertical distance of the core remains relatively constant while typing the sequence, whereas the segments D1S1 and D1S2 lift in the vertical direction prior to each key strike and then drop in the vertical direction during the actual strike. The disparity between D1S1 and D1S2 in this graph is once again indicative of the forward and left motion in the J to Y sequence as compared to the J to M sequence in which the spike is with the D1S2 variable.

Figure 10J:
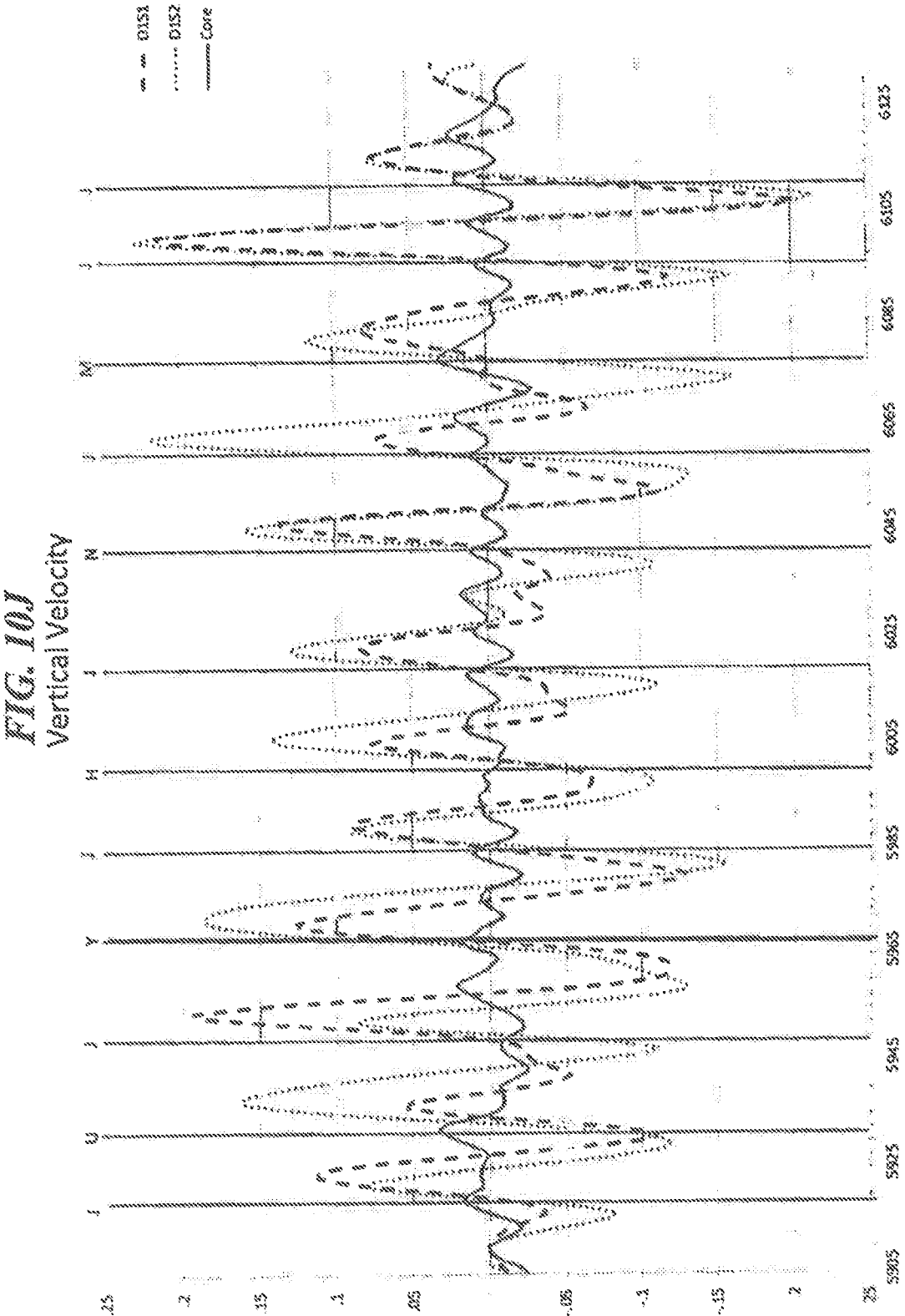
FIG. 10J is a graph of vertical velocity as a function of time for the sequence of key strikes of FIG. 10A.

In FIG. 10J, vertical velocity is shown for each of the core of the user's right hand, the user's right D1S1, and the user's right D1S2. The vertical velocity of each of these components, expressed in terms of feet per second, is plotted as a function of time, which is expressed in terms of image frame number. Each key stroke is labeled in the graph with a vertical line. As shown, the relationship between D1S1 and D1S2 is unique for each key sequence. For example, D1S1 has a greater vertical velocity than D1S2 during the J to Y sequence, whereas the opposite is true for the J to M sequence. Similarly, there is a very close mirroring between D1S1 and D1S2 during the J to J sequence.

Figure 10K:
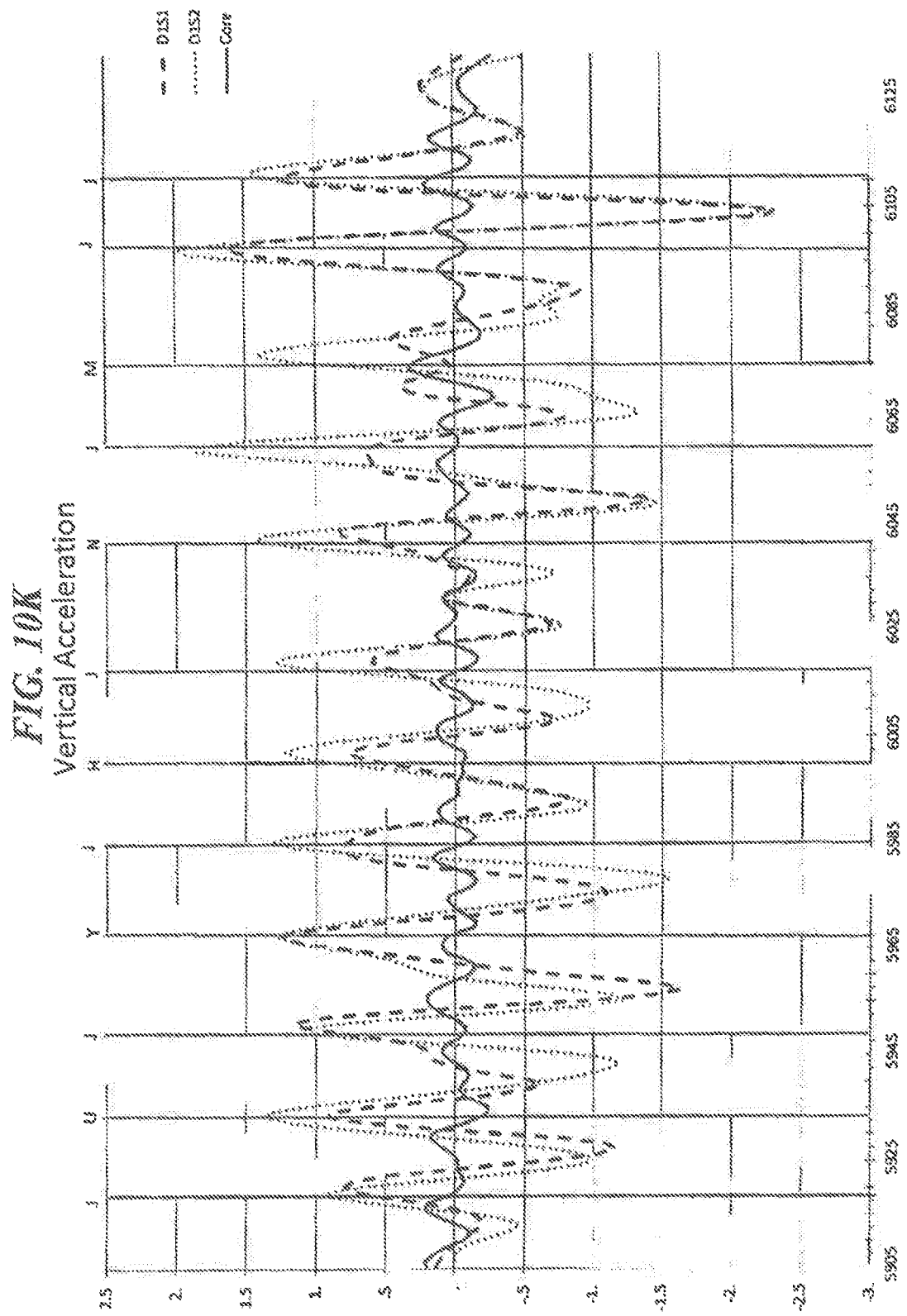
FIG. 10K is a graph of vertical acceleration as a function of time for the sequence of key strikes of FIG. 10A.
Figure 11:
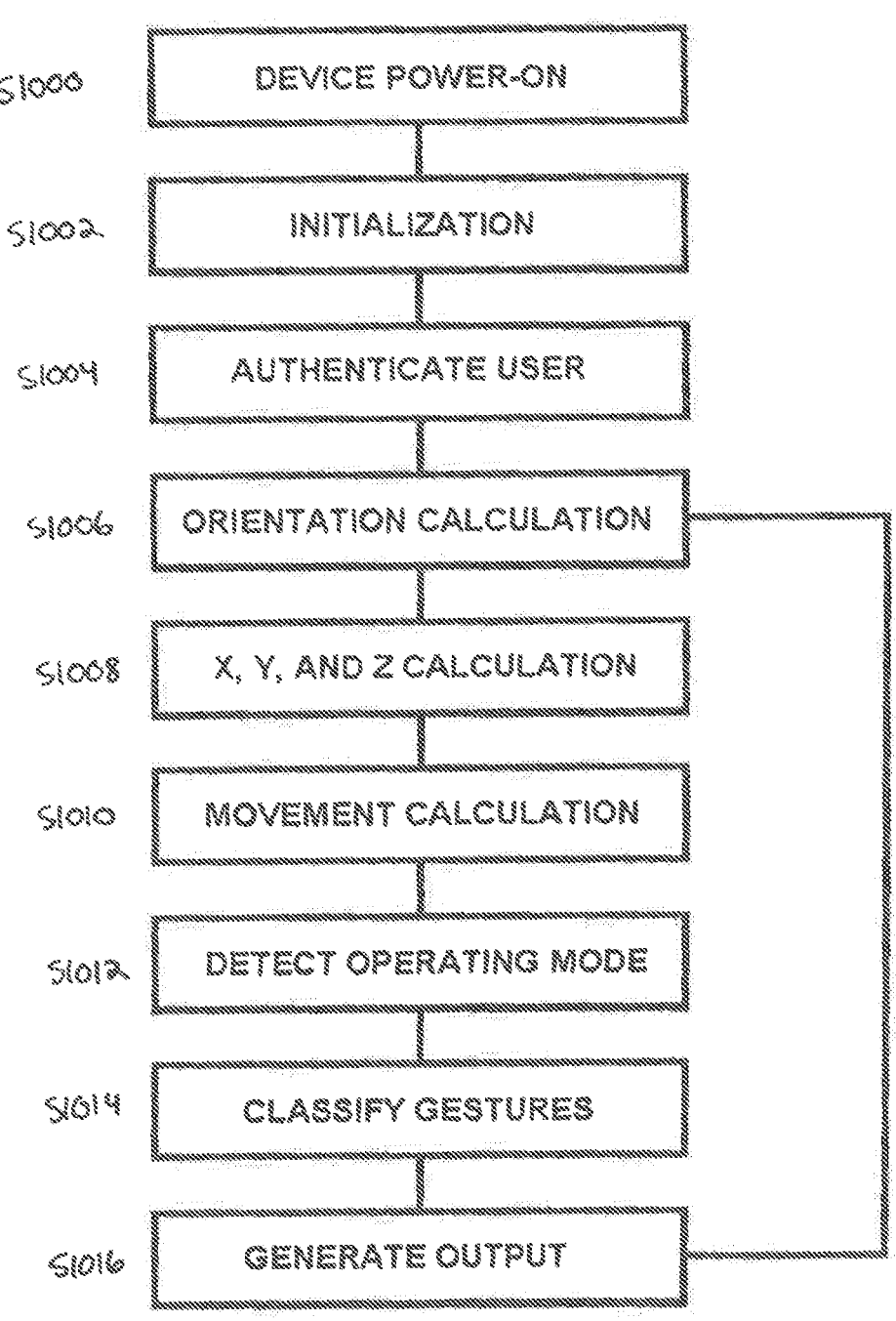

In FIG. 10K, vertical acceleration is shown for each of the core of the user's right hand, the user's right D1S1, and the user's right D1S2. The vertical acceleration of each of these components, expressed in terms of feet per second per second, is plotted as a function of time, which is expressed in terms of image frame number. Each key stroke is labeled in the graph with a vertical line. As shown, the vertical acceleration of the core remains relatively constant while typing the sequence, whereas the vertical acceleration of the segments D1S1 and D1S2 spike at the timing with which each "key" is struck.

The above graphs illustrate the 2D perspective of a single sensor. The 3D equivalent of this 2D motion data can be calculated using known algorithms, for example as disclosed in the references incorporated herein.

The device 100 can use one or more of the motion variables described above and/or various other information to determine when and where a strike occurs. In some embodiments, the device 100 can determine the fastest mover (e.g., the digit with the most acceleration and/or velocity) to isolate the currently-striking finger from other fingers that may be initiating a subsequent strike. The position of the fingertip of the currently-striking finger can then be calculated relative to the core to determine which key was struck. For example, if the user's right D1 is isolated as the currently-striking finger, the position of the user's right D1S1 relative to the core can be calculated to determine which key is being struck. If the right D1S1 moves from a "J" position to a position closer to the core in the Z direction, and towards D1S2 in the X direction, the gesture can be interpreted as an "M" strike. By way of further example, if the right D1S1 moves from a "J" position to a position that is approximately the same distance from the core in the Z direction and away from D1S2 in the X direction, the gesture can be interpreted as an "H" strike.

Alternatively, or in addition, motion of one hand component relative to another hand component can be analyzed to classify a strike. For example, in some embodiments, it can be assumed that the joint J2 of a striking finger drops in the Y direction when the finger is moving forward in the Z direction and lifts in the Y direction when the finger is moving backward in the Z direction. Because each of these methods has some inherent error, the system can use both techniques such that the redundancy eliminates most of the error.

Throughout this process, probability-based algorithms can be used to eliminate false strikes (e.g., those which may result when the user is a "concert mover").

Unlike prior art systems in which only velocity is monitored to determine when a strike occurs, the device 100 can use a multivariate approach in which far more accurate strike detection can be obtained. In particular, strike classification in the device 100 can be determined at least in part based on the acceleration of various components of the user's hands, a motion parameter that tends to have a signature which is relatively consistent across differing typing styles and hand sizes or shapes. In some embodiments, the classification module can determine which key is struck based on a combination of angular displacement, acceleration, linear velocity, and vertical distance.

It will further be appreciated that data generated in one or more devices in accord with the present teachings can be used to generate a classification system for use by the same or different classification modules. By way of example, rather than simply identifying a particular user's intended input based on the user's particular movement, the classification system can generate a data warehouse of typical user inputs so as to continually improve its ability to recognize general patterns of a particular behavior, determine or refine anatomical rules as discussed otherwise herein, and/or improve the classification of an un-calibrated user. By way of example, the classification system can be populated with information based on the appearance of a quintessential keystroke across a broad range of users so as to reliably classify the intended user input of an unknown user.

Strength Rating Module

The device 100 can also include a strength rating module 328 that continually or intermittently monitors the quality of the sensor data being acquired. When the strength rating module determines that detecting strength is sufficiently weak (e.g., when the user's hands are positioned in such a way that several digits or segments are obscured by other digits or segments, or are beyond the range of the sensors 102, 104), a warning can be issued to the user prompting them to re-orient their hands or to move closer to the device 100.

The strength rating module 328 can also be used to assess the reliability of custom gestures defined by the user, as discussed above. The strength rating module 328 can also compare custom gestures to other stored gestures to make sure each is sufficiently unique to avoid any additional chance of error. The calculated strength rating can also be used in a customer service environment to troubleshoot the device 100 or to assist a user that is having difficulty using the device 100. The use of a calculated strength rating in this setting can eliminate the need to divulge other, more sensitive information to a customer service representative, such as unique hand dimensions or other properties used by the security module 314.

Adaptability Module

The device 100 can also include an adaptability module 330. The adaptability module 330 can extend the functionality of the device 100 beyond the basic keyboard, number pad, and mouse input modes. For example, the adaptability module 330 can allow the user to assign customized meanings to various gestures, templates, or a custom pad, each of which can be assessed by the strength rating module 328 and/or stored by the gesture library module 310 as described above. In other words, the adaptability module 330 can allow the user to define custom modes (e.g., non-QWERTY keyboard, a foreign language based keyboard) for use instead of, or in addition to, the standard input modes. This can allow the user to define a custom keypad, for example one that includes symbols, function keys, macros, or even characters in a different language. The custom pad can be accessed by entering a custom pad input mode, which in some embodiments can be indicated by a gesture opposite to that of the number pad input mode. For example, if moving the dominant hand forward and/or slightly outward is effective to transition into the number pad input mode, moving the non-dominant hand forward and/or slightly outward can be effective to transition into the custom pad input mode. The adaptability module 330 can also allow the user to assign custom meanings to the keys or buttons defined on a template, or to unique gestures which can be performed without departing from the standard input modes. Accordingly, the user can customize a template such that it includes one or more commonly-used characters, functions, macros, etc., or assign a particular input or function to a custom gesture or input pad, as shown for example in FIGS. 8D and 8E. For example, a template having a programmable fixed key could be assigned a particular function (e.g., a certain note in a piano keyboard, Page Up, commonly used work function, etc.). The template can also be customized by user-defined sections on the template with only written or printed references as to their function.

In various aspects, the adaptability module 330 can provide for changes in the function of the device and/or the interpretation of various gestures by the classification module, for example, based on various parameters such as the environment in which the device is operating. In some embodiments, the adaptability module 330 can identify tags that can inform the processor of the type of function that a user typically uses in a particular environment or location. By way of example, if the current location of the device is identified as being in a public space (e.g., through the inability of the digital data processing system to detect a known or safe wireless network), the adaptability module can generate a tag such that indicates to the processor to alter the security settings. For example, if the device is identified as being in a public space, the adaptability module 330 can indicate that the identity of the user should be continuously monitored, e.g., through behavioral and/or anatomical features of the user via gestures in the workspace. Likewise, if the particular project or document that is being manipulated by the data processing system is particularly sensitive, the adaptability module 330 can be configured to increase the monitoring by the security module.

Additionally, tags can be used to help identify typical functions and/or gestures used in a particular environment. By way of example, rules can be created by a user or administrator to indicate that if the current location of the device is identified as being at a user's home or in a particular location (e.g., through the identification of the "home" wireless network or the detection of a signal identifying a specific location), a user's particular motions can be interpreted differently than if the user is identified as being at the office. For example, though an accountant at their office can have a rule that certain gestures of the left hand is associated with commonly used function keys, that same motion at home can be set to be interpreted as a different function. For example, when in the kitchen, the accountant's gesture with the left hand may instead bring up a list of recipes.

Methods

Figure 11:
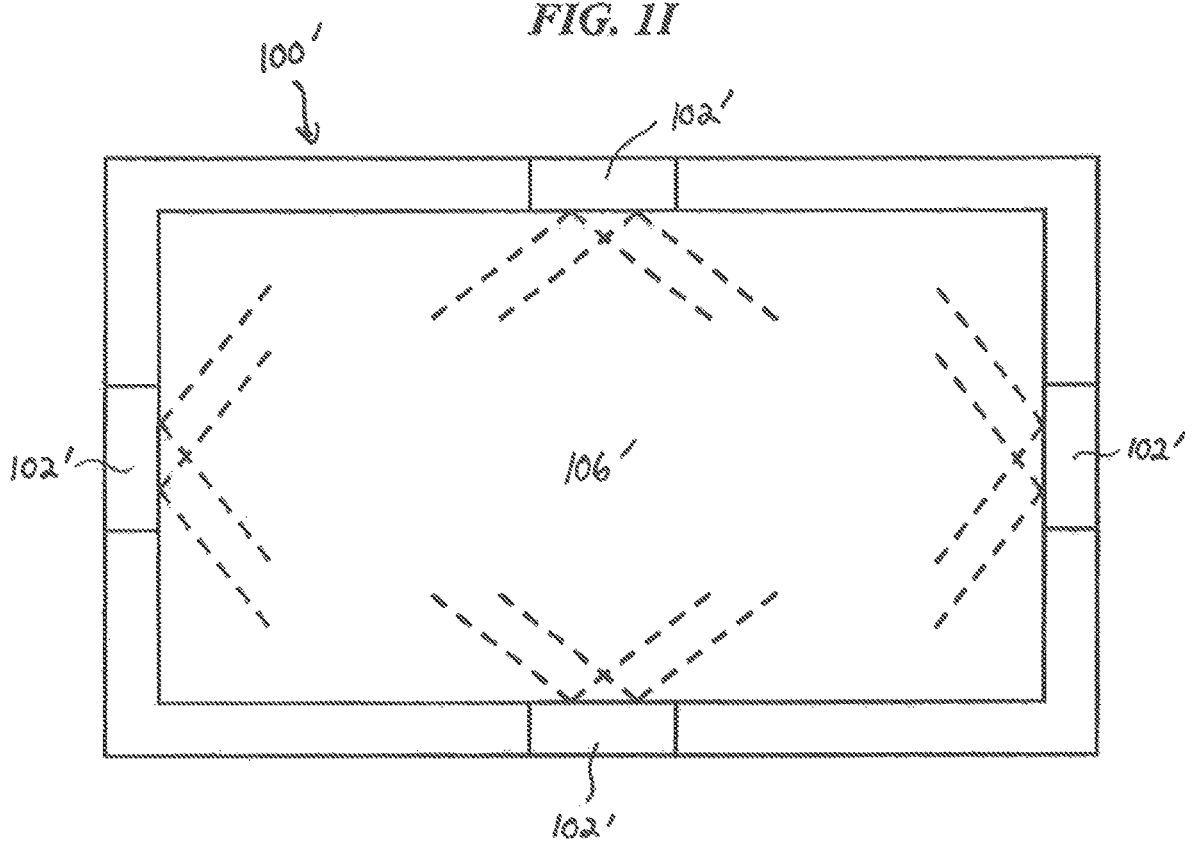
FIG. 11 is a flow chart depicting one exemplary method of operation of a gesture recognition input device.

One exemplary method of operation of the device 100 is illustrated schematically in the flow chart of FIG. 11. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention.

As shown, the method can begin with device power-on at step S1000, followed by an initialization step S1002. During the initialization step S1002, the user can present their hands into the workspace, at which point the device measures the various attributes of the user such as the size, position, and/or angle of the user's hands, fingers, finger joints, finger segments, finger nails, and so forth. Based on this information, a profile is created and optionally stored by the user profile module 302.

Operation then proceeds to step S1004, in which the profile information created during the initialization step S1002 is used to authenticate the user. During this step, the security module 314 compares the acquired profile information to one or more sets of stored profile information associated with authorized users. If the acquired profile information matches the profile information of an authorized user, operation proceeds to step S1006. Otherwise, the device 100 is locked to prevent use by an unauthorized user. As noted above, profile information that is compared for security purposes can include physical attributes of the user's hands, as well as behavioral traits of the user. It will be appreciated that the sensitivity of the security parameters can be adjusted by the user or an administrator.

At step S1006, the orientation calculation module 304 begins calculating a core position for each hand that is visible to the sensors 102, 104 of the device 100. Using the core position and the angle it forms with the various components of the user's hands, the orientation module 304 determines the position and orientation of the hands relative to each other and relative to the device 100.

At step S1008, the motion calculation module 324 determines more reliable X, Y, and Z values for each digit in the workspace by comparing data from the first sensor 102 and data from the second sensor 104.

At step S1010, the motion calculation module 324 generates data streams indicative of motion in the X, Y, and Z directions for one or more hands, fingers, or segments in the workspace 106 by comparing successive image frames or other snapshots of sensor data. Exemplary motion data includes vertical distance, vertical velocity, vertical acceleration, horizontal distance, horizontal velocity, horizontal acceleration, angular displacement, angular velocity, angular acceleration, and the like.

At step S1012, the mode selection module 308 determines which operating mode the user desires, and sets the universe of possible outputs accordingly.

As step S1014, the classification module 326 incorporates the data generated in steps S1006 through S1012 to interpret user gestures as "key" strokes, mouse movements, number pad inputs, and so forth. Once the gestures are classified, a corresponding output is generated at step S1016 and provided to one or more digital data processing systems to which the device 100 is coupled.

Steps S1006 through S1016 are performed continuously or intermittently (but not necessarily at the same rate or in the same order) to monitor the workspace for user gestures and produce a corresponding output for use by the digital data processing system.

In view of the foregoing, it will be appreciated that the methods and devices disclosed herein can free a user from the confines of traditional input devices. Effortlessly and intuitively, the user can manipulate technology in a much more comfortable and efficient way. The methods and devices disclosed herein can also provide various health benefits. A user who is "on the go" is no longer required to carry around extra equipment and the freedom of hand orientation permitted by the disclosed methods and devices can provide a number of ergonomic benefits.

In view of the foregoing, it will be appreciated that the methods and devices disclosed herein can not only provide an initial gating function prior to granting access to a secure system but also provide unique security advantages which can directly connect the security function with the data that it is intending to secure by repeatedly, intermittently, or continuously confirming the authenticity of the user as the secured data is manipulated. The security function can provide continuous and, if appropriate, simultaneous levels of security.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An input device for a digital data processing system, comprising:

at least one sensor that observes a workspace and generates data indicative of one or more parameters of an input agent within the workspace; and a processor that identifies gestures made by the input agent from the data generated by the at least one sensor and that generates user input information based on the gestures, wherein the processor further comprises:

a user profile module configured to identify a plurality of anatomical landmarks of at least one hand of the input agent and to determine locations of the plurality of anatomical landmarks within the workspace over time based on the data generated by the at least one sensor;

a classification module configured to identify a gesture based on positioning of the plurality of anatomical landmarks over time by assessing movement of at least one anatomical landmark of the plurality of anatomical landmarks relative to another anatomical landmark and by assigning the gesture to detected changes in the plurality of anatomical landmarks;

an adaptability module that is configured to identify a location or an environment where the input device is located, wherein functioning of the input device is adjusted based on the location or the environment where the input device is located; and a security module configured to monitor the movement of the at least one anatomical landmark or the positioning of the at least one anatomical landmark of the input agent to ensure that the input agent is an authorized user, wherein monitoring of the movement or the positioning of the at least one anatomical landmark by the security module is adjusted based on the location or the environment where the input device is located, the security module is configured to continually monitor the movement of the at least one anatomical landmark or the positioning of the at least one anatomical landmark of the input agent to ensure that the input agent remains authorized.

2. The input device of claim 1, wherein the adaptability module is configured to assign a customized meaning to the gesture and to store the customized meaning to a gesture library.

3. The input device of claim 2, wherein the classification module uses the location or the environment to determine the gesture.

4. The input device of claim 1, wherein the adaptability module is configured to define a custom mode.

5. The input device of claim 1, wherein, upon identification of the input device being located in a public space, the security module is configured to increase an amount of monitoring relative to when the input device is located in a private space.

6. The input device of claim 1, wherein the processor further comprises:

a strength rating module configured to monitor quality of the data generated by the at least one sensor.

7. The input device of claim 6, wherein the strength rating module is configured to:

determine that a detecting strength is low; and issue a warning to adjust a position of a hand of the input agent.

8. The input device of claim 6, wherein the strength rating module is configured to compare the gesture to a stored gesture to ensure that the gesture is capable of being distinguished from the stored gesture, and the gesture is a custom gesture.

9. The input device of claim 6, wherein the strength rating module is configured to generate a calculated strength rating for the gesture.

10. The input device of claim 1, wherein the processor further comprises:

an orientation module that establishes a core value for a hand of the input agent, the core value indicating a position of a core of the hand within the workspace; and a motion calculation module that analyzes the data generated by the at least one sensor and the core value over time to generate a set of values indicative of changes in the plurality of anatomical landmarks over time.

11. The input device of claim 10, wherein the orientation module establishes the core value based on at least one of an observed position or orientation of one or more anatomical landmarks on the hand of the input agent.

12. The input device of claim 10, wherein the core is a center of a dorsum of the hand of the input agent.

13. The input device of claim 10, wherein the core value is adjusted during use of the input device by the input agent.

14. The input device of claim 10, wherein the classification module is configured to use values for the core value over time to determine the gesture.

15. The input device of claim 10, wherein the processor further comprises:

a mode selection module configured to switch the input device between a plurality of operating modes, wherein the motion calculation module is configured to identify a change in the core value, and the mode selection module is configured to switch the input device to another operating mode based on identification of the change in the core value.

16. The input device of claim 1, wherein the security module is configured to continually monitor the movement of the at least one anatomical landmark or the positioning of the at least one anatomical landmark of the input agent after an initial user authentication.

17. An input device for a digital data processing system, comprising:

at least one sensor that observes a workspace and generates data indicative of one or more parameters of an input agent within the workspace; and a processor that identifies gestures made by the input agent from the data generated by the at least one sensor and that generates user input information based on the gestures, wherein the processor further comprises:

a user profile module configured to identify a plurality of anatomical landmarks of at least one hand of the input agent and to determine locations of the plurality of anatomical landmarks within the workspace over time based on the data generated by the at least one sensor;

a classification module configured to identify a gesture based on positioning of the plurality of anatomical landmarks over time by assessing movement of at least one anatomical landmark of the plurality of anatomical landmarks relative to another anatomical landmark and by assigning the gesture to detected changes in the plurality of anatomical landmarks;

an adaptability module that is configured to identify a location or an environment where the input device is located, wherein functioning of the input device is adjusted based on the location or the environment where the input device is located;

a security module configured to monitor the movement of the at least one anatomical landmark or the positioning of the at least one anatomical landmark of the input agent to ensure that the input agent is an authorized user, wherein monitoring of the movement or the positioning of the at least one anatomical landmark by the security module is adjusted based on the location or the environment where the input device is located;

an orientation module that establishes a core value for a hand of the input agent, wherein the core value indicates a position of a core of the hand within the workspace, and the core is a center of a dorsum of the hand of the input agent; and a motion calculation module that analyzes the data generated by the at least one sensor and the core value over time to generate a set of values indicative of changes in the plurality of anatomical landmarks over time.

18. An input device for a digital data processing system, comprising:

at least one sensor that observes a workspace and generates data indicative of one or more parameters of an input agent within the workspace; and a processor that identifies gestures made by the input agent from the data generated by the at least one sensor and that generates user input information based on the gestures, wherein the processor further comprises:

a user profile module configured to identify a plurality of anatomical landmarks of at least one hand of the input agent and to determine locations of the plurality of anatomical landmarks within the workspace over time based on the data generated by the at least one sensor;

a classification module configured to identify a gesture based on positioning of the plurality of anatomical landmarks over time by assessing movement of at least one anatomical landmark of the plurality of anatomical landmarks relative to another anatomical landmark and by assigning the gesture to detected changes in the plurality of anatomical landmarks;

an adaptability module that is configured to identify a location or an environment where the input device is located, wherein functioning of the input device is adjusted based on the location or the environment where the input device is located;

a security module configured to monitor the movement of the at least one anatomical landmark or the positioning of the at least one anatomical landmark of the input agent to ensure that the input agent is an authorized user, wherein monitoring of the movement or the positioning of the at least one anatomical landmark by the security module is adjusted based on the location or the environment where the input device is located;

an orientation module that establishes a core value for a hand of the input agent, wherein the core value indicates a position of a core of the hand within the workspace;

a motion calculation module that analyzes the data generated by the at least one sensor and the core value over time to generate a set of values indicative of changes in the plurality of anatomical landmarks over time; and a mode selection module configured to switch the input device between a plurality of operating modes, wherein the motion calculation module is configured to identify a change in the core value, and the mode selection module is configured to switch the input device to another operating mode based on identification of the change in the core value.

* * * * *